(12) United States Patent
Shin et al.

(10) Patent No.: US 10,180,530 B2
(45) Date of Patent: Jan. 15, 2019

(54) DIRECTIONAL BACKLIGHT UNIT AND 3D IMAGE DISPLAY APPARATUS HAVING THE SAME

(71) Applicant: SAMSUNG ELECTRONICS CO., LTD., Suwon-si (KR)

(72) Inventors: Bongsu Shin, Seoul (KR); Joonyong Park, Suwon-si (KR); Hyunjoon Kim, Seoul (KR); Dongouk Kim, Pyeongtaek-si (KR); Jihyun Bae, Seoul (KR); Dongsik Shim, Hwaseong-si (KR); Sunghoon Lee, Seoul (KR); Jaeseung Chung, Suwon-si (KR); Seogwoo Hong, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 15/236,604

(22) Filed: Aug. 15, 2016

(65) Prior Publication Data

US 2017/0168209 A1     Jun. 15, 2017

(30) Foreign Application Priority Data

Dec. 9, 2015  (KR) .................. 10-2015-0175346

(51) Int. Cl.
*G02B 27/22*   (2018.01)
*F21V 8/00*    (2006.01)
*G02F 1/1335*  (2006.01)

(52) U.S. Cl.
CPC ........... *G02B 6/005* (2013.01); *G02B 6/0026* (2013.01); *G02B 6/0068* (2013.01); *G02B 27/22* (2013.01);

(Continued)

(58) Field of Classification Search
CPC .................. G02B 6/005; G02B 6/0068
See application file for complete search history.

(56) References Cited

U.S. PATENT DOCUMENTS 7,903,332 B2 * 3/2011 De Zwart ............ H04N 13/317
                                                359/463
7,936,512 B2 * 5/2011 Konishi ................. G02B 27/60
                                                250/237 G (Continued)

FOREIGN PATENT DOCUMENTS

JP          4470388 B2      6/2010
KR    1020070072153 A       7/2007

(Continued)

OTHER PUBLICATIONS

Jyrki Kimmel and Tapani Levola., "Mobile display backlight light guide plates based on slanted grating arrays", SPIE Eco-Photonics 2011: Sustainable Design, Manufacturing, and Engineering Workforce Education for a Green Future, Proc. of SPIE vol. 8065, 806518, (2011), (pp. 806518-1-806518-9, 9 Pages Total) DOI: 10.1117/12.882924.

(Continued)

*Primary Examiner* — Jayanti K Patel
*Assistant Examiner* — Irfan Habib
(74) *Attorney, Agent, or Firm* — Sughrue Mion, PLLC

(57) ABSTRACT

A directional backlight unit and a three-dimensional image display apparatus including the directional backlight unit are provided. The directional backlight unit includes a light source, a light guide plate guiding light emitted from the light source, and a diffraction device including a plurality of sections. Each of the sections includes a grating pattern set configured to adjust the direction of light incident from the light guide plate.

34 Claims, 20 Drawing Sheets

(52) U.S. Cl.
CPC .. *G02F 1/133606* (2013.01); *G02F 1/133615* (2013.01)

(56) References Cited

U.S. PATENT DOCUMENTS

| | | | | |
|---|---|---|---|---|
| 8,786,934 B2* | 7/2014 | Kimura | ................... | G02F 1/167 |
| | | | | 359/296 |
| 8,870,430 B2* | 10/2014 | Kamikatano | ........ | G02B 6/0036 |
| | | | | 362/606 |
| 9,128,226 B2* | 9/2015 | Fattal | ................... | G02B 6/0036 |
| 9,195,092 B2* | 11/2015 | Escuti | ............... | G02F 1/133528 |
| 9,201,283 B2* | 12/2015 | Xu | ........................... | G02F 1/167 |
| 9,298,168 B2* | 3/2016 | Taff | .................... | G02B 27/2292 |
| 9,389,415 B2* | 7/2016 | Fattal | ................... | G02B 26/0808 |
| 9,459,461 B2* | 10/2016 | Santori | ................... | G02B 27/22 |
| 9,557,466 B2* | 1/2017 | Fattal | ................... | G02B 6/0068 |
| 10,028,716 B2* | 7/2018 | Rossl | ................... | A61B 6/484 |
| 2005/0122743 A1* | 6/2005 | Lin | ...................... | G02B 6/0043 |
| | | | | 362/615 |
| 2008/0204876 A9 | 8/2008 | McGrew | | |
| 2010/0284085 A1* | 11/2010 | Laakkonen | ........ | G02B 6/12007 |
| | | | | 359/575 |
| 2011/0057870 A1* | 3/2011 | Miyashita | ............... | G02F 1/167 |
| | | | | 345/107 |
| 2011/0141395 A1* | 6/2011 | Yashiro | ................ | G02B 6/0036 |
| | | | | 349/62 |
| 2011/0182570 A1* | 7/2011 | Yeh | ........................ | G03B 35/22 |
| | | | | 396/326 |
| 2011/0242461 A1* | 10/2011 | Escuti | ............... | G02F 1/133504 |
| | | | | 349/96 |
| 2011/0273760 A1* | 11/2011 | Hsieh | ..................... | G02F 1/167 |
| | | | | 359/296 |
| 2012/0008067 A1* | 1/2012 | Mun | ...................... | G02B 6/003 |
| | | | | 349/65 |
| 2012/0013962 A1* | 1/2012 | Subbaraman | .......... | B82Y 20/00 |
| | | | | 359/15 |
| 2012/0057131 A1* | 3/2012 | Li | ........................ | G02B 3/005 |
| | | | | 353/7 |
| 2012/0057676 A1* | 3/2012 | Koehler | ................... | G21K 1/06 |
| | | | | 378/85 |
| 2012/0113678 A1* | 5/2012 | Cornelissen | ......... | G02B 6/0038 |
| | | | | 362/607 |
| 2012/0127751 A1* | 5/2012 | Kimmel | ............... | G02B 6/0036 |
| | | | | 362/602 |
| 2012/0176665 A1* | 7/2012 | Song | ................... | G02B 27/2242 |
| | | | | 359/298 |
| 2012/0249934 A1* | 10/2012 | Li | ..................... | G02F 1/133504 |
| | | | | 349/96 |
| 2012/0250141 A1* | 10/2012 | Chen | ........................ | G02B 1/06 |
| | | | | 359/320 |
| 2013/0057539 A1* | 3/2013 | Kim | ................... | G02F 1/134309 |
| | | | | 345/419 |
| 2013/0201723 A1* | 8/2013 | Gourlay | ............... | G02B 6/0036 |
| | | | | 362/613 |
| 2013/0314763 A1* | 11/2013 | Wang | ..................... | G02F 1/167 |
| | | | | 359/296 |
| 2014/0293759 A1* | 10/2014 | Taff | .................... | G02B 27/2292 |
| | | | | 368/239 |
| 2014/0300840 A1* | 10/2014 | Fattal | ................ | G02F 1/133615 |
| | | | | 349/15 |
| 2014/0300947 A1* | 10/2014 | Fattal | ................ | G02B 26/0808 |
| | | | | 359/298 |
| 2014/0300960 A1* | 10/2014 | Santori | ................... | G02B 27/22 |
| | | | | 359/462 |
| 2015/0036068 A1* | 2/2015 | Fattal | .................... | G02B 6/0036 |
| | | | | 349/15 |
| 2015/0355403 A1* | 12/2015 | Santori | ............... | G02B 6/0036 |
| | | | | 362/606 |
| 2018/0113313 A1* | 4/2018 | Tekolste | ............ | G02B 27/0172 |
| 2018/0180793 A1* | 6/2018 | Fattal | ...................... | G02C 7/04 |

FOREIGN PATENT DOCUMENTS

| | | |
|---|---|---|
| KR | 1020080028133 A | 3/2008 |
| WO | 2013180725 A1 | 12/2013 |
| WO | 2015016844 A1 | 2/2015 |

OTHER PUBLICATIONS

Communication dated Mar. 28, 2017, from the European Patent Office in counterpart European Application No. 16198421.6.

* cited by examiner

A-A

| SE11 : 0.2 (G) | SE12 : 0.2 (G) | SE13 : 0.2 (G) | SE14 : 0.2 (G) | SE15 : 0.2 (G) |
|---|---|---|---|---|
| SE21 : 0.3 (G) | SE22 : 0.3 (G) | SE23 : 0.3 (G) | SE24 : 0.3 (G) | SE25 : 0.3 (G) |
| SE31 : 0.4 (G) | SE32 : 0.4 (G) | SE33 : 0.4 (G) | SE34 : 0.4 (G) | SE35 : 0.4 (G) |
| SE41 : 0.5 (G) | SE42 : 0.5 (G) | SE43 : 0.5 (G) | SE44 : 0.5 (G) | SE45 : 0.5 (G) |
| SE51 : 1.0 (G) | SE52 : 1.0 (G) | SE53 : 1.0 (G) | SE54 : 1.0 (G) | SE55 : 1.0 (G) |

DIRECTIONAL BACKLIGHT UNIT AND 3D IMAGE DISPLAY APPARATUS HAVING THE SAME

CROSS-REFERENCE TO RELATED APPLICATION

This application claims priority from Korean Patent Application No. 10-2015-0175346, filed on Dec. 9, 2015 in the Korean Intellectual Property Office, the disclosure of which is incorporated herein by reference in its entirety.

BACKGROUND

1. Field

Apparatuses and methods consistent with exemplary embodiments relate to a directional backlight unit having improved light uniformity and a 3D image display apparatus including the directional backlight unit.

2. Description of the Related Art

Along with the popularity of three-dimensional (3D) movies, technology for 3D image display apparatuses has been researched. 3D image display apparatuses may display 3D images based on binocular parallax. Currently commercialized binocular-parallax 3D image display apparatuses are configured to display 3D images by providing left-eye and right-eye images having different viewpoints to the left and right eyes of viewers. Such 3D image display apparatuses may be classified into glass-required 3D image display apparatuses requiring special glasses and glass-free 3D image display apparatuses not requiring special glasses.

Examples of glass-required 3D image display apparatuses include red-green glasses type 3D image display apparatuses used for movie theaters, and polarizing glasses or liquid crystal shutter glasses type 3D image display apparatuses for TVs. Glass-free 3D image display apparatuses may be classified according to the structures thereof as barrier-type 3D image display apparatuses, lenticular-type 3D image display apparatuses, etc. In addition, glass-free 3D image display apparatuses may be classified according to image forming methods as multi-view rendering 3D image display apparatuses, volumetric 3D image display apparatuses configured to contain all 3D space information and display the information in a 3D space using voxels, integral imaging 3D image display apparatuses capturing images at multiple angles using lenses shaped like compound eyes of insects (flies' eyes) and inversely displaying the images, holographic 3D image display apparatuses, 3D image display apparatuses using directional backlight units, etc.

Directional backlight units may form 3D images by adjusting the output direction of light using gratings. Light propagating in a light guide plate reaches an end of the light guide plate while being totally reflected. However, a relatively large amount of light is output through a propagation start region of the light guide plate, and the amount of light output from the light guide plate decreases in a direction away from the propagation start region of the light guide plate, thereby resulting in poor optical uniformity.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide directional backlight units having improved optical uniformity.

Further, One or more exemplary embodiments provide three-dimensional (3D) image display apparatuses including directional backlight units having improved optical uniformity.

According to an aspect of an exemplary embodiment, there is provided a directional backlight unit including: a light source; a light guide plate including an entrance surface receiving light emitted from the light source, the light guide plate guiding the light emitted from the light source; and a diffraction device comprising a plurality of sections, each of the sections comprising a grating pattern set configured to adjust a direction of light exiting the light guide plate, wherein the grating pattern set comprises a plurality of grating units, and the grating units comprise a plurality of sub-grating units dependent on a waveband of light.

The plurality of sub-grating units may be configured to adjust an output amount of light in a section of the diffraction device relatively close to the entrance surface of the light guide plate among the plurality of sections, and adjust an output amount of light in a section of the diffraction device relatively distant from the entrance surface of the light guide plate among the plurality of sections.

The plurality of grating units may include a first sub-grating unit corresponding to a red wavelength band, a second sub-grating unit corresponding to a green wavelength band, and a third sub-grating unit corresponding to a blue wavelength band, wherein the first sub-grating unit has an area of a first size, the second sub-grating unit has an area of a second size, and the third sub-grating unit has an area of a third size, and wherein the first size, the second size, and the third size are different from each other.

The plurality of sub-grating units in each of the plurality of sections may have different sizes of areas.

Sizes of areas of the plurality of sub-grating units may increase in a propagation direction of the light incident from the light guide plate.

Widths of the plurality of sub-grating units may increase in the propagation direction of the light incident from the light guide plate.

The plurality of grating units respectively corresponds to a plurality of color light beams, and sizes of areas of the plurality of sub-grating units may increase respectively in propagation directions of the plurality of color light beams.

A height of the plurality of grating units in one of the plurality of sections at a first distance from the entrance surface of the light guide plate may be greater than a height of the plurality of grating units in another one of the plurality of sections at a second distance from the entrance surface of the light guide plate, the second distance being greater than the first distance.

The plurality of grating units may respectively correspond to a plurality of color light beams, and sizes of areas of the plurality of grating units may increase respectively in propagation directions of the plurality of color light beams.

A first duty cycle of the plurality of grating units in a first section of the plurality of sections at a first distance from the entrance surface of the light guide plate may be adjusted to have a light output efficiency greater than a light output efficiency obtained by a second duty cycle of the plurality of grating units in a second section of the plurality of sections at a second distance from the entrance surface of the light guide plate, the first distance being greater than the second distance. The first duty cycle may correspond to a ratio of a land width to a pitch of the plurality of grating units in the first section of the plurality of sections, and the second duty cycle may correspond to a ratio of a land width to a pitch of the plurality of grating units in the second section of the plurality of sections.

At least one of a refractive index, a height, a pitch, and a duty cycle of each of the plurality of grating units is different from each other.

The plurality of grating units may have different area sizes according to a direction of the incident light and a number of the plurality of sections.

According to an aspect of another embodiment, there is provided a directional backlight unit including: a light guide plate that includes a plurality of entrance surfaces respectively receiving the color light beams emitted from the light sources and guides the color light beams emitted from the light sources; and a diffraction device including a plurality of sections, each of the plurality of sections including a plurality of grating units configured to adjust a direction of the light exiting the light guide plate, wherein each of the plurality of grating units includes sub-grating units respectively corresponding to the color light beams, and areas of the plurality of sub-grating units corresponding to a color light beam of the color light beams may vary in a propagation direction of the color light beam.

According to an aspect of another embodiment, there is provided a 3D image display apparatus includes: a light source; a light guide plate that includes an entrance surface receiving light emitted from the light source and guides the light emitted from the light source; a diffraction device comprising a plurality of sections, each of the plurality of sections comprising a grating pattern set configured to adjust a direction of the light exiting the light guide plate; and a display panel configured to generate images based on the light output from the diffraction device, wherein the grating pattern set may include a plurality of grating units, and the plurality of grating units includes a plurality of sub-grating units dependent on a wavelength band and having different areas.

According to an aspect of another embodiment, there is provided a directional backlight unit including; at least one light source configured to emit a first light in a first propagation direction, a second light in a second propagation direction, and a third light in a third propagation direction; a plurality of first grating units that corresponds to a wavelength band of the first light and is arranged to have sizes of areas of the plurality of first grating units increase in the first propagation direction, a plurality of second grating units that corresponds to a wavelength band of the second light and is arranged to have sizes of areas of the plurality of second grating units increase in the second propagation direction; a plurality of third grating units that corresponds to a wavelength band of the third light and is arranged to have sizes of areas of the plurality of third grating units increase in the third propagation direction; and a plurality of sections that is arranged in a matrix format, each of the plurality of sections comprising one of the plurality of first grating units, one of the plurality of second grating units, and one of the plurality of third grating units.

The plurality of first grating units may be arranged to have heights of lands of the plurality of first grating units increase in the first propagation direction.

The plurality of first grating units may be arranged to have width of lands of the plurality of first grating units increase in the first propagation direction.

Refractive indexes of the plurality of first grating units may vary in the first propagation direction so that light output efficiency values of the plurality of first grating units increase in the first propagation direction.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
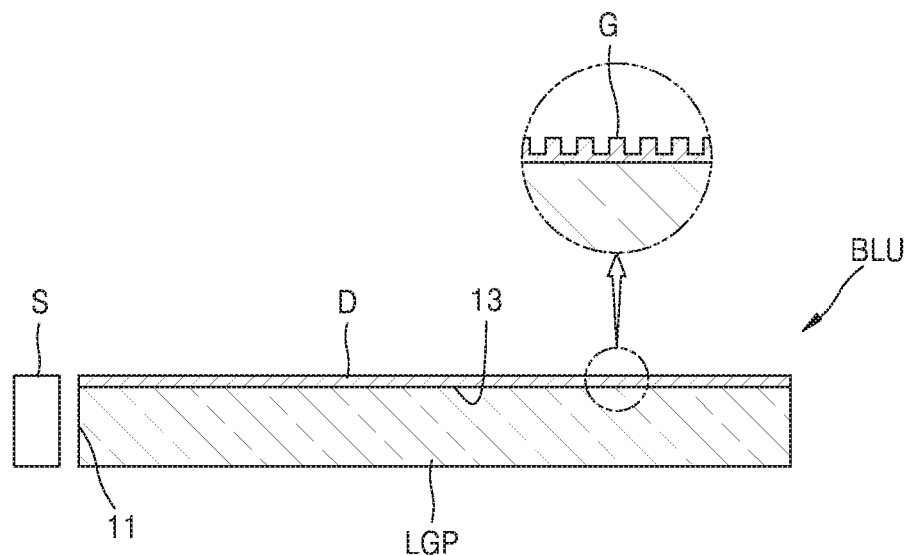
FIG. 1 is a view schematically illustrating a directional backlight unit according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

Hereinafter, backlight units and three-dimensional (3D) image display apparatuses including the backlight units will be described according to embodiments with reference to the accompanying drawings.

In the drawings, like reference numbers refer to like elements, and the size of each element may be exaggerated for clarity of illustration. It will be understood that although the terms "first", "second", etc. may be used herein to describe various components, these components should not be limited by these terms. These terms are only used to distinguish one element from another.

As used herein, the singular forms "a," "an" and "the" are intended to include the plural forms as well, unless the context clearly indicates otherwise. It will be further understood that the terms "comprises," "comprising," "includes," and/or "including used herein specify the presence of stated features or elements, but do not preclude the presence or addition of one or more other features or elements.

In the present disclosure, terms such as units or modules are used to denote a unit having at least one function or performing at least one operation and implemented with hardware, software, or a combination of hardware and software. In addition, expressions such as "A is provided on B" may be construed to mean that A is provided to B in a contact or non-contact manner.

FIG. 1 is a view schematically illustrating a directional backlight unit BLU according to an exemplary embodiment. The backlight unit BLU may include a light source S emitting light, a light guide plate LGP guiding light emitted from the light source S, a diffraction device D arranged on the light guide plate LGP.

For example, the light source S may be arranged along at least one lateral side of the light guide plate LGP. For example, the light source S may emit light having at least one wavelength band. For example, the light source S may include a light emitting diode (LED) or a laser diode (LD). A plurality of LEDs or LDs may be arranged along at least one lateral side of the light guide plate LGP. The light guide plate LGP may guide light coming from the light source S while reflecting the light and may output the light through an upper side of the light guide plate LGP. The light guide plate LGP may include: at least one entrance surface 11 receiving light emitted from the light source S; and an exit surface 13 through which light propagating in the light guide plate LGP is output.

Figure 2A:
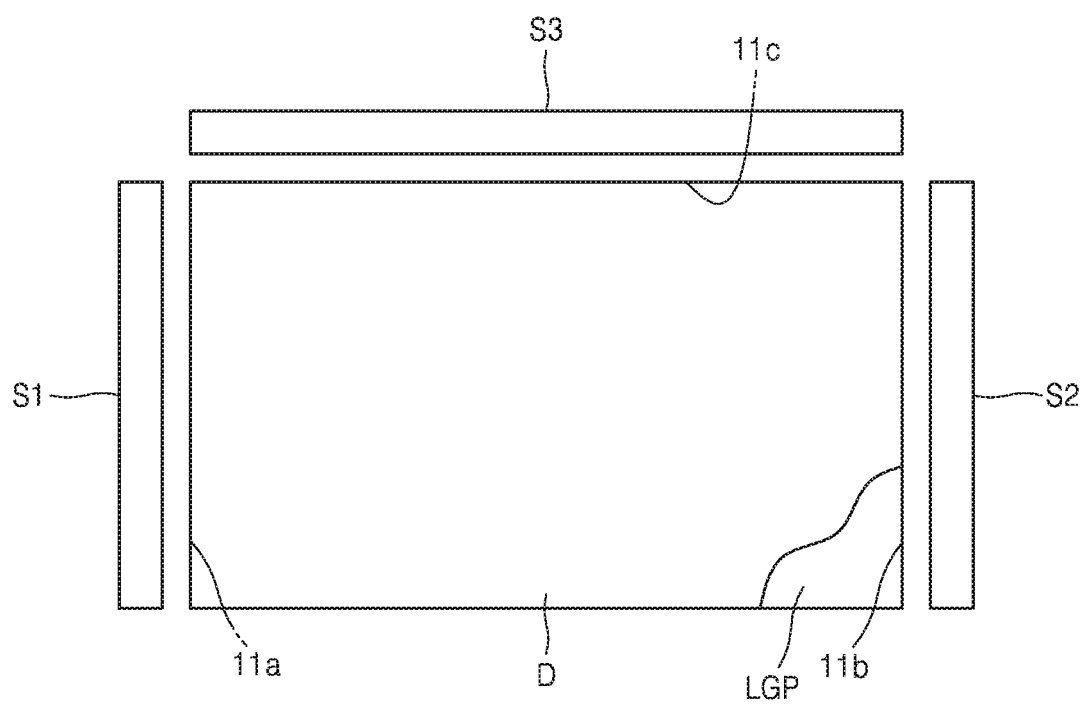
FIGS. 2A, 2B, and 2C are plan views illustrating directional backlight units having different light source arrangements according to exemplary embodiments.
Figure 2B:
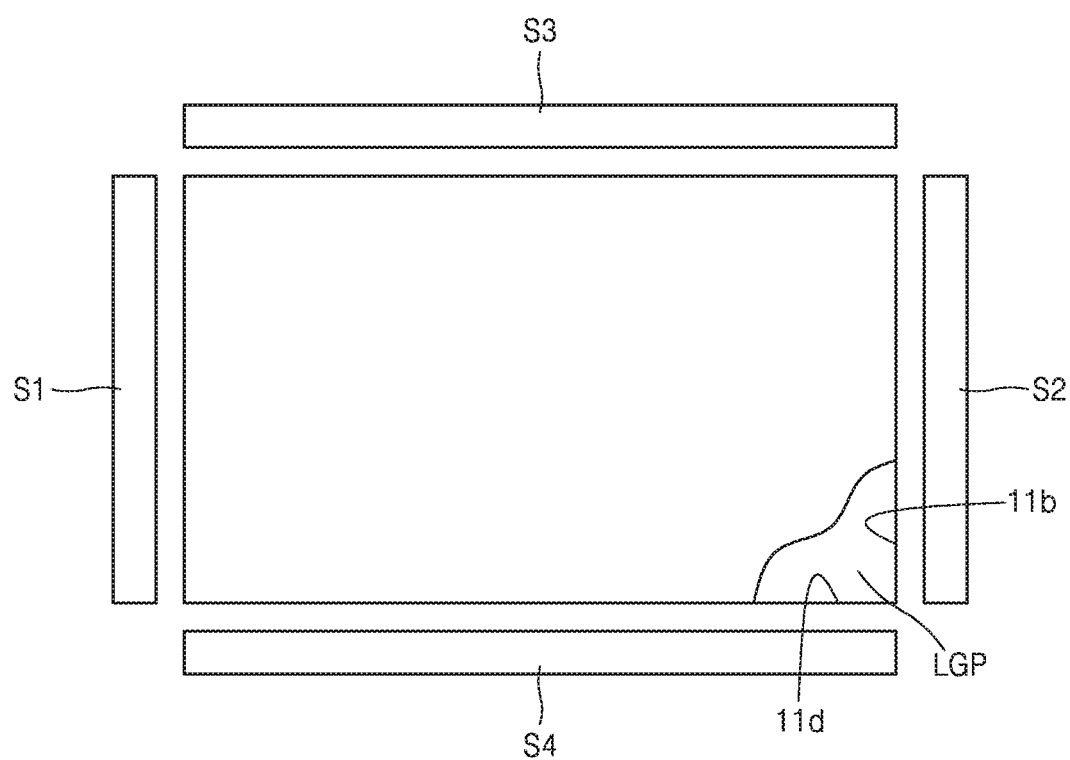
Figure 2C:
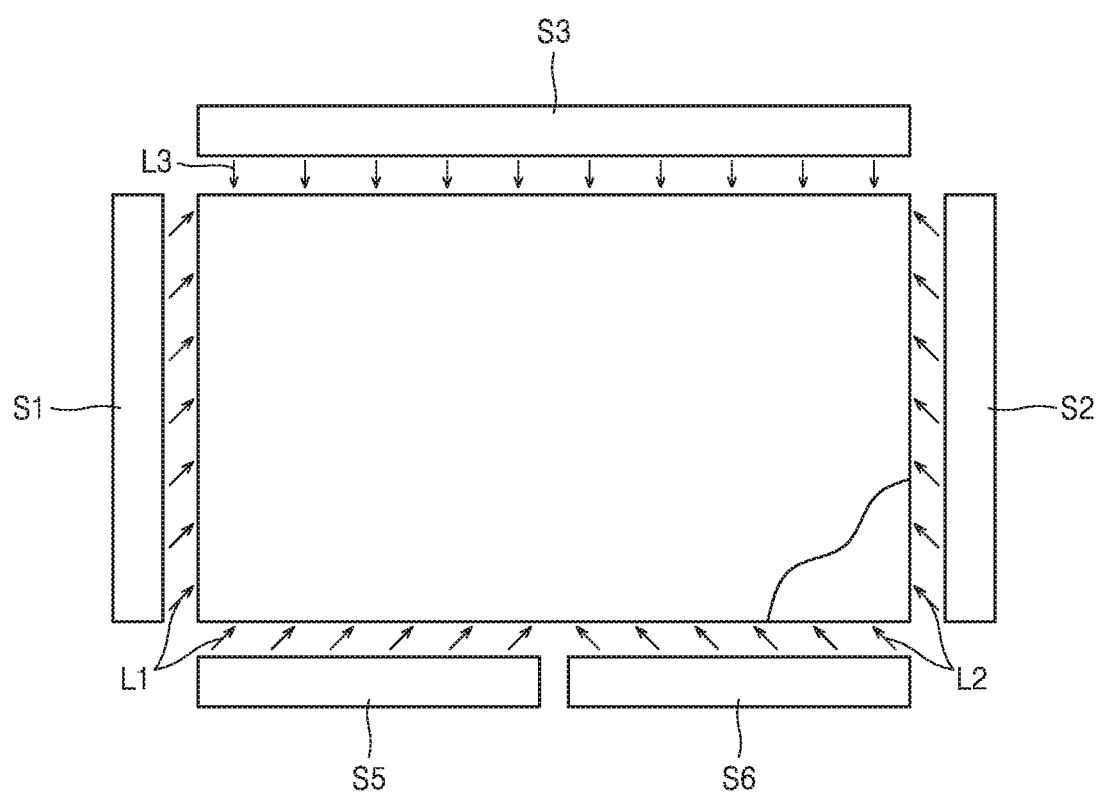

FIGS. 2A to 2C are plan views illustrating directional backlight units BLU in which light sources S are differently arranged. Referring to FIG. 2A, for example, light sources S may include a first light source S1 emitting light having a first wavelength band, a second light source S2 emitting light having a second wavelength band, and a third light source S3 emitting light having a third wavelength band. For example, the first light source S1 may emit red light, the second light source S2 may emit blue light, and the third light source L3 may emit green light. For example, a light guide plate LGP may have a rectangular parallelepiped shape. The first light source S1 may be arranged along a first lateral side of the light guide plate LGP, the second light source S2 may be arranged along a second lateral side of the light guide plate LGP, and the third light source S3 may be arranged along a third lateral side of the light guide plate LGP. The light guide plate LGP may include a first entrance surface 11a receiving light emitted from the first light source S1, a second entrance surface 11b receiving light emitted from the second light source S2, and a third entrance surface 11c receiving light emitted from the third light source S3. However, the arrangement of the first to third light sources S1 to S3 is not limited thereto. That is, the first to third light sources S1 to S3 may be arranged in a manner different from the arrangement shown in FIG. 2A. For example, the first to third light sources S1 to S3 may be alternately arranged along a lateral side of the light guide plate LGP.

In the example shown in FIG. 2A, the light sources S includes the first to third light sources S1 to S3 arranged along three sides of the light guide plate LGP. In addition, the light guide plate LGP includes the first entrance surface 11a receiving light emitted from the first light source S1, the second entrance surface 11b receiving light emitted from the second light source S2, and the third entrance surface 11c receiving light emitted from the third light source S3.

Referring to an example shown in FIG. 2B, first to fourth light sources S1 to S4 are respectively arranged along four sides of a light guide plate LGP. For example, the first light source S1 may emit red light, the second light source S2 may emit blue light, and the third light source L3 may emit green light. The fourth light source S4 may emit light having a wavelength different from wavelengths of light emitted from the first to third light sources S1 to S3. Alternatively, the fourth light source S4 may emit light having one of red, blue, green colors to add an amount of light for the one of the three colors. For example, the fourth light source S4 may emit red light. In this manner, the amount of light may be increased as the number of light sources having less optical efficiency than the other light sources increases. The light guide plate LGP may include a first entrance surface 11a receiving light emitted from the first light source S1, a second entrance surface 11b receiving light emitted from the second light source S2, a third entrance surface 11c receiving light emitted from the third light source S3, and a fourth entrance surface 11d receiving light emitted from the fourth light source S4.

Referring to FIG. 2C, a first light source S1 may be arranged along a first lateral side of a light guide plate LGP, a second light source S2 may be arranged along a second lateral side of the light guide plate LGP, a third light source S3 may be arranged along a third lateral side of the light guide plate LGP, a fifth light source S5 and a sixth light source S6 may be arranged along a fourth lateral side of the light guide plate LGP. For example, the first light sources S1 may emit first light L1, the second light sources S2 may emit second light L2, and the third light source S3 may emit third light L3. The first light L1 and the second light L2 may be obliquely incident on the light guide plate LGP at an inclined angle, and the third light L3 may be obliquely incident on the light guide plate LGP in a direction perpendicular to the light guide plate LGP. For example, first light L1 emitted from one of the first light source S1 may be incident on the light guide plate LGP at the same angle at which first light L1 emitted from the fifth light source S5 is incident on the light guide plate LGP. For example, second light L2 emitted from the second light source S2 may be incident on the light guide plate LGP at the same angle at which second light L2 emitted from the sixth light source S6 is incident on the light guide plate LGP. Although the first light source S1 and the fifth light source S5 are illustrated as being separated from each other, the first light source S1 and the fifth light source S5 may correspond to a single light source that emits light in a same wavelength range in a same direction. Likewise, the second light source S2 and the sixth light source S6 may correspond to another single light source that emits light in a same wavelength range in a same direction. Since the first light source S1 and the fifth light source S2 are arranged along different lateral sides of the light guide plate LGP as described above, the amount of first light L1 may increase. Also, the amount of second L1 may increase because the second light source S2 and the sixth light source S6 are arranged along different lateral sides of the light guide plate LGP. Besides the above-described examples, the number and arrangement of light sources may be variously adjusted or varied.

The diffraction device D may include gratings G. The diffraction device D may adjust the exit direction of light according to at least one of the angle of incidence of the light to the light guide plate LGP and the wavelength of the light. For example, the angle of incidence of light to the light guide plate LGP may correspond to the exit direction of the light in which the light exits the light guide plate LGP. In addition, the diffraction device D may have selectivity with respect to wavelengths of light. In other words, the diffraction device D may include grating patterns interacting with light having particular wavelength bands.

For example, the diffraction device D may include a plurality of grating pattern sets corresponding to at least one of the directions of light incident on the diffraction device D from the light guide plate LGP or the wavelength of the light. Light of particular wavelengths may interact with the gratings G of the diffraction device D, and the light may exit the diffraction device D in particular directions according to the combination of factors such as the pitch of the gratings G, the arrangement direction of the gratings G, the refractive index of the gratings G, the width of lands of the gratings G, or the angle of the gratings G relative to the propagation direction of the light.

Figure 3:
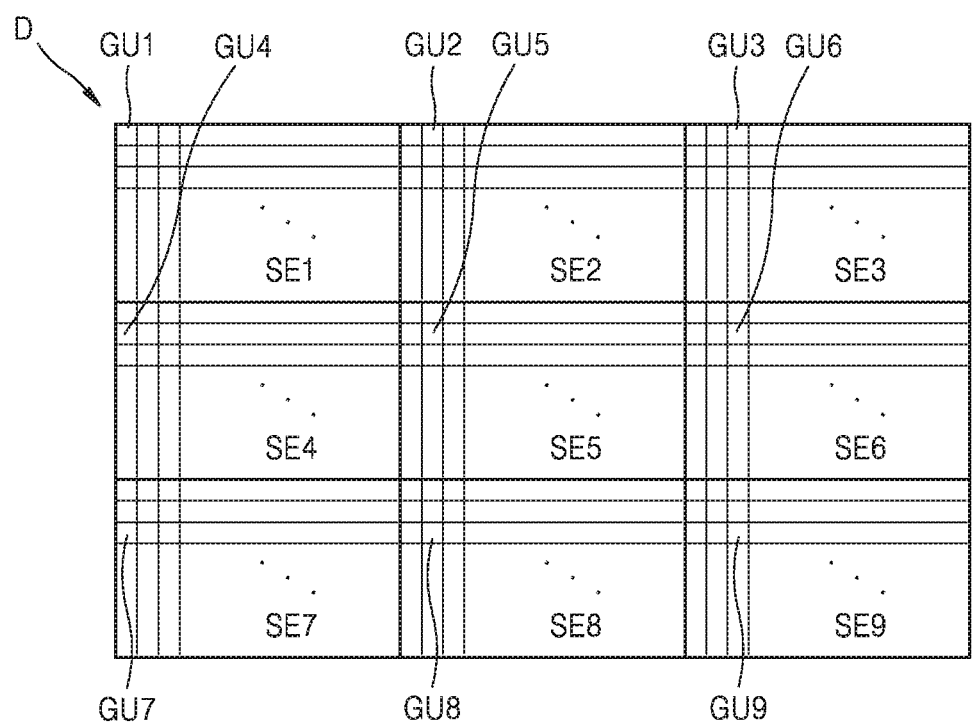
FIG. 3 is a view illustrating a diffraction device of a directional backlight unit according to an exemplary embodiment.

FIG. 3 is a schematic view illustrating grating pattern sets of a diffraction device D according to an exemplary embodiment. The diffraction device D may include a plurality of sections SE. The sections SE may include different grating pattern sets. Here, the sections SE may refer to physically separated regions. Alternatively, the sections SE may be regions separated according to the grating pattern sets. For example, light may exit the diffraction device D in different directions according to the grating pattern sets of the diffraction device D. Light exiting in different directions may provide different views, and thus 3D images may be realized. Here, the term "view" may refer to an image provided to one eye of a viewer. However, the present embodiment is not limited thereto. For example, an image realizing two or more views may be provided to one eye of a viewer. The diffraction device D may control the exit direction of light. When different views are provided to a viewer according to the exit direction of light, the view may perceive 3D images. For example, a plurality of views such as 36 views, 48 views, or 96 views may be provided according to the grating pattern sets.

Referring to FIG. 3, for example, the diffraction device D may include first to ninth sections SE1, SE2, SE3, SE4, SE5, SE6, SE7, SE8, and SE9. Here, the sections SE may be regions including different grating pattern sets. In other examples, the diffraction device D may include nine sections SE, sixteen sections SE, or twenty five sections SE. Besides, the diffraction device D may include another number of sections SE.

In the example shown in FIG. 3, different grating pattern sets are included in the first to ninth sections SE1, SE2, SE3, SE4, SE5, SE6, SE7, SE8, and SE9. Each of the grating pattern sets may include a plurality of grating units, and the grating units may be different in different sections SE. The grating units may be the smallest units of the grating pattern sets. For example, the grating units may include grating patterns corresponding to pixels of a 3D image display apparatus. For example, the first section SE1 may include a first grating unit GU1, the second section SE2 may include a second grating unit GU2, the third section SE3 may include a third grating unit GU3, the fourth section SE4 may include a fourth grating unit GU4, the fifth section SE5 may include a fifth grating unit GU5, the sixth section SE6 may include a sixth grating unit GU6, the seventh section SE7 may include a seventh grating unit GU7, the eighth section SE8 may include an eighth grating unit GU8, and the ninth section SE9 may include a ninth grating unit GU9.

Figure 4:
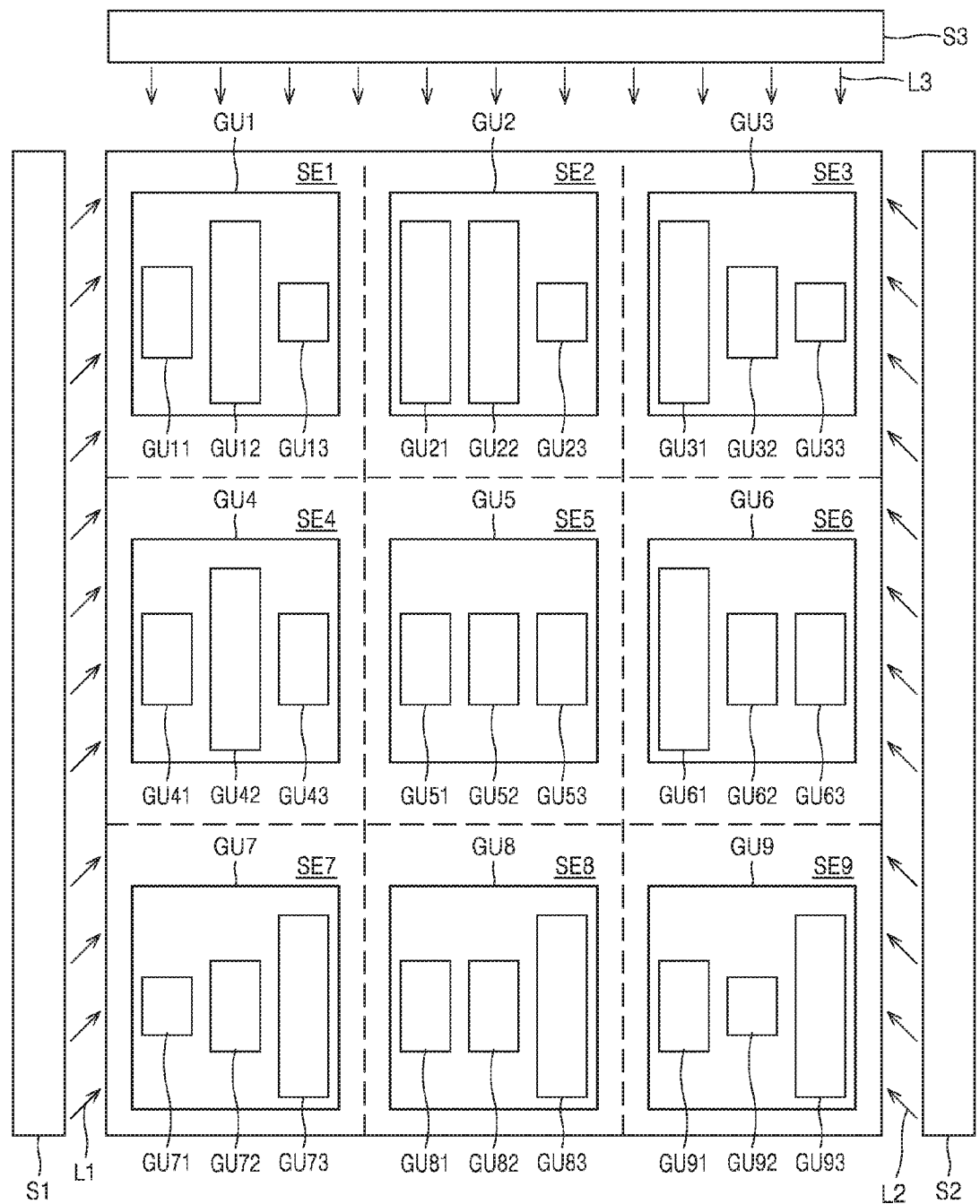
FIG. 4 is a schematic view illustrating grating units in sections of the diffraction device depicted in FIG. 3 according to an exemplary embodiment.

FIG. 4 illustrates example structures of the first to ninth grating units GU1, GU2, GU3, GU4, GU5, GU6, GU7, GU8, and GU9. For example, each of the grating units may include sub-grating units. For example, the sub-grating units may include grating patterns corresponding to sub-pixels of a 3D image display apparatus. For example, the sub-grating units may include grating patterns dependent on wavelength bands of light. For example, the sub-grating units may include first sub-grating units diffracting first wavelength light (e.g., light having a red wavelength band), second sub-grating units diffracting second wavelength light (e.g., light having a blue wavelength band), and third sub-grating units diffracting third wavelength light (e.g., light having a green wavelength band). However, the present embodiment is not limited thereto. That is, sub-grating units corresponding to various wavelength bands may be provided. In the exemplary embodiment, the sub-grating units may have different sizes of areas. For example, the sub-grating units of the grating units may have different area ratios in different sections SE.

Referring to FIG. 4, the first grating unit GU1 may include a first-first sub-grating unit GU11, a first-second sub-grating unit GU12, and a first-third sub-grating unit GU13. The second grating unit GU2 may include a second-first sub-grating unit GU21, a second-second sub-grating unit GU22, and a second-third sub-grating unit GU23. The third grating unit GU3 may include a third-first sub-grating unit GU31, a third-second sub-grating unit GU32, and a third-third sub-grating unit GU33. The fourth grating unit GU4 may include a fourth-first sub-grating unit GU41, a fourth-second sub-grating unit GU42, and a fourth-third sub-grating unit GU43. The fifth grating unit GU5 may include a fifth-first sub-grating unit GU51, a fifth-second sub-grating unit GU52, and a fifth-third sub-grating unit GU53. The sixth grating unit GU6 may include a sixth-first sub-grating unit GU61, a sixth-second sub-grating unit GU62, and a sixth-third sub-grating unit GU63. The seventh grating unit GU7 may include a seventh-first sub-grating unit GU71, a seventh-second sub-grating unit GU72, and a seventh-third sub-grating unit GU73. The eighth grating unit GU8 may include an eighth-first sub-grating unit GU81, an eighth-second sub-grating unit GU82, and an eighth-third sub-grating unit GU93. The ninth grating unit GU9 may include a ninth-first sub-grating unit GU91, a ninth-second sub-grating unit GU92, and a ninth-third sub-grating unit GU93.

For example, the first to ninth grating units GU1 to GU9 may have different sub-grating unit area ratios. In this case, all the first to ninth grating units GU1 to GU9 may have different sub-grating unit area ratios, or some of the first to ninth grating units GU1 to GU9 may have the same sub-grating unit area ratio. The sub-grating unit area ratios may be set such that the output amount of light in a section SE relatively close to an entrance surface of a light guide plate LGP may be adjusted relative to the output amount of light in a section SE relatively distant from the entrance surface of the light guide plate LGP. The uniformity of light may be improved across a light exit surface of the light guide plate LGP by adjusting the output amount of light as described above.

The output amount of light may be adjusted by varying the light output efficiency of each section SE. For example, the light output efficiency of each section may be adjusted by varying the areas of sub-grating units. In addition to this, the light output efficiency may be adjusted by varying at least one of the pitch, height, width of lands, and refractive index of gratings.

According to an exemplary embodiment, the optical uniformity of a directional backlight unit may be improved by varying the areas of sub-grating units in each section SE.

For example, each grating unit may include a plurality of sub-grating units. For example, the grating units may include grating patterns corresponding to pixels of a display panel. The pixels may be units controlling the transmittance of light. The sub-grating units may include grating patterns corresponding to sub-pixels of a display panel. The sub-pixels may be units controlling the transmittance of light and wavelength selectivity. For example, the sub-pixels may be wavelength selection units of a color filter.

In FIG. 4, one grating unit is shown on an enlarged scale in each section SE of the diffraction device for clarity of illustration. The grating pattern set in each section SE may include corresponding grating units. In addition, each of the grating units may include a plurality of sub-grating units. For example, each of the grating units may include three sub-grating units. However, the number of sub-grating units is not limited thereto. That is, the number of sub-grating units may be varied.

The grating pattern set of the first section SE1 may include the first grating unit GU1. For example, the first grating unit GU1 may include the first-first sub-grating unit GU11, the first-second sub-grating unit GU12, and the first-third sub-grating unit GU13. The grating pattern set of the second section SE2 may include the second grating unit GU2. For example, the second grating unit GU2 may include the second-first sub-grating unit GU21, the second-second sub-grating unit GU22, and the second-third sub-grating unit GU23. The grating pattern set of the third section SE3 may include the third grating unit GU3. For example, the third grating unit GU3 may include the third-first sub-grating unit GU31, the third-second sub-grating unit GU32, and the third-third sub-grating unit GU33. The grating pattern set of the fourth section SE4 may include the fourth grating unit GU4. For example, the fourth grating unit GU4 may include the fourth-first sub-grating unit GU41, the fourth-second sub-grating unit GU42, and the fourth-third sub-grating unit GU43.

The grating pattern set of the fifth section SE5 may include the fifth grating unit GU5. For example, the fifth grating unit GU5 may include the fifth-first sub-grating unit GU51, the fifth-second sub-grating unit GU52, and the fifth-third sub-grating unit GU53. The grating pattern set of the sixth section SE6 may include the sixth grating unit GU6. For example, the sixth grating unit GU6 may include the sixth-first sub-grating unit GU61, the sixth-second sub-grating unit GU62, and the sixth-third sub-grating unit GU63. The grating pattern set of the seventh section SE7 may include the seventh grating unit GU7. For example, the seventh grating unit GU7 may include the seventh-first sub-grating unit GU71, the seventh-second sub-grating unit GU72, and the seventh-third sub-grating unit GU73. The grating pattern set of the eighth section SE8 may include the eighth grating unit GU8. For example, the eighth grating unit GU8 may include the eighth-first sub-grating unit GU81, the eighth-second sub-grating unit GU82, and the eighth-third sub-grating unit GU83. The grating pattern set of the ninth section SE9 may include the ninth grating unit GU9. For example, the ninth grating unit GU9 may include the ninth-first sub-grating unit GU91, the ninth-second sub-grating unit GU92, and the ninth-third sub-grating unit GU93.

As shown in FIG. 4, the sub-grating units of the grating units may have different sizes of areas. In another exemplary embodiment, the sub-grating units of the grating units may have different area ratios in different sections.

In another exemplary embodiment, the first sub-grating units of the grating units corresponding to first wavelength light may have different sizes of areas in a propagation direction of the first wavelength light. In addition, the second sub-grating units of the grating units corresponding to second wavelength light may have different sizes of areas in a propagation direction of the second wavelength light. In addition, the third sub-grating units of the grating units corresponding to third wavelength light may have different sizes of areas in a propagation direction of the third wavelength light. This will be further described later.

Figure 5:
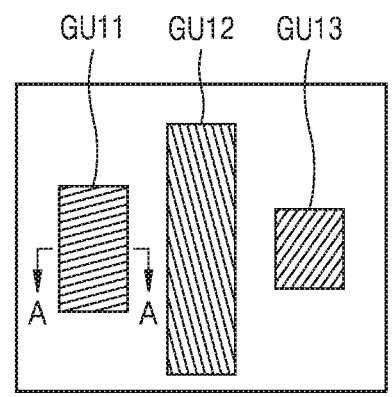
FIG. 5 is a view illustrating a grating unit included in a first section of the diffraction device depicted in FIG. 4, according to an exemplary embodiment.
Figure 5:
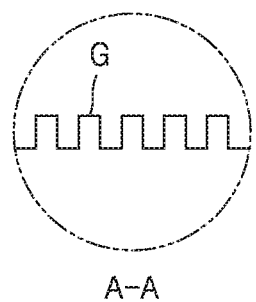

FIG. 5 is a detailed view illustrating the first grating unit GU1. The first grating unit GU1 may include grating patterns respectively corresponding to the first-first sub-grating unit GU11, the first-second sub-grating unit GU12, and the first-third sub-grating unit GU13. For example, the grating patterns may have different arrangements in different sub-grating units. The first-first sub-grating unit GU11, the first-second sub-grating unit GU12, and the first-third sub-grating unit GU13 may have different sizes of areas. Like this, the sub-grating units of the second to ninth grating units GU2 to GU9 included in different sections SE may have different sizes of areas. Furthermore, the sub-grating units may have different area ratios in different sections SE. The area ratios of the sub-grating units of the sections SE may be set such that the output amount of light in a section SE relatively close to a corresponding entrance surface of the light guide plate LGP (or a corresponding light source) may be adjusted relatively to the output amount of light in a section SE relatively distant from the corresponding entrance surface of the light guide plate LGP (or the corresponding light source).

For example, referring to FIG. 4, the first sub-grating units of the grating units may correspond to a first light source S1, the second sub-grating units of the grating units may correspond to a second light source S2, and the third sub-grating units of the grating units may correspond to a third light source S3.

If first light L1 emitted from the first light source S1 is incident on the light guide plate LGP in a diagonal upward direction as shown in FIG. 4, the areas of the first sub-grating units of the sections SE corresponding to the first light source S1 may increase in a propagation direction of the first light L1, that is, in a direction away from an entrance surface of the first light L1 (or in a direction away the first light source S1). For example, the areas of the seventh-first sub-grating unit GU71, the fifth-first sub-grating unit GU51, and the third-first sub-grating unit GU31 may gradually increase in the propagation direction of the first light L1. In addition, the areas of the fourth-first sub-grating unit GU41 and the second-first sub-grating unit GU21 may increase in the propagation direction of the first light L1.

If second light L2 emitted from the second light source S2 is incident on the light guide plate LGP in a diagonal upward direction, the areas of the second sub-grating units of the sections SE corresponding to the second light source S2 may increase in a propagation direction of the second light L2, that is, in a direction away from an entrance surface of the second light L2 (or in a direction away the second light source S2). For example, the areas of the ninth-second sub-grating unit GU92, the fifth-second sub-grating unit GU52, and the first-second sub-grating unit GU12 may gradually increase in the propagation direction of the second light L2. In addition, the areas of the sixth-second sub-grating unit GU62 and the second-second sub-grating unit GU22 may increase in the propagation direction of the first light L2.

If third light L3 emitted from the third light source S3 is incident on the light guide plate LGP, the areas of the third sub-grating units of the sections SE corresponding to the third light source S3 may increase in a propagation direction of the third light L3, that is, in a direction away from an entrance surface of the third light L3 (or in a direction away the third light source S3). For example, the third light L3 may be incident on the light guide plate LGP in a direction perpendicular to the light guide plate LGP. The areas of the second-third sub-grating unit GU23, the fifth-third sub-grating unit GU53, and the eighth-third sub-grating unit GU83 may gradually increase in the propagation direction of the third light L3. If light is incident in a direction perpendicular to the light guide plate LGP as described above, the propagation direction of the light may be approximately parallel with columns of the sections SE. Therefore, the area ratio of the first-third sub-grating unit GU13, the fourth-third sub-grating unit GU43, the seventh-third sub-grating unit GU73 may be equal to the area ratio of the second-third sub-grating unit GU23, the fifth-third sub-grating unit GU53, and the eighth-third sub-grating unit GU83.

Figure 6:
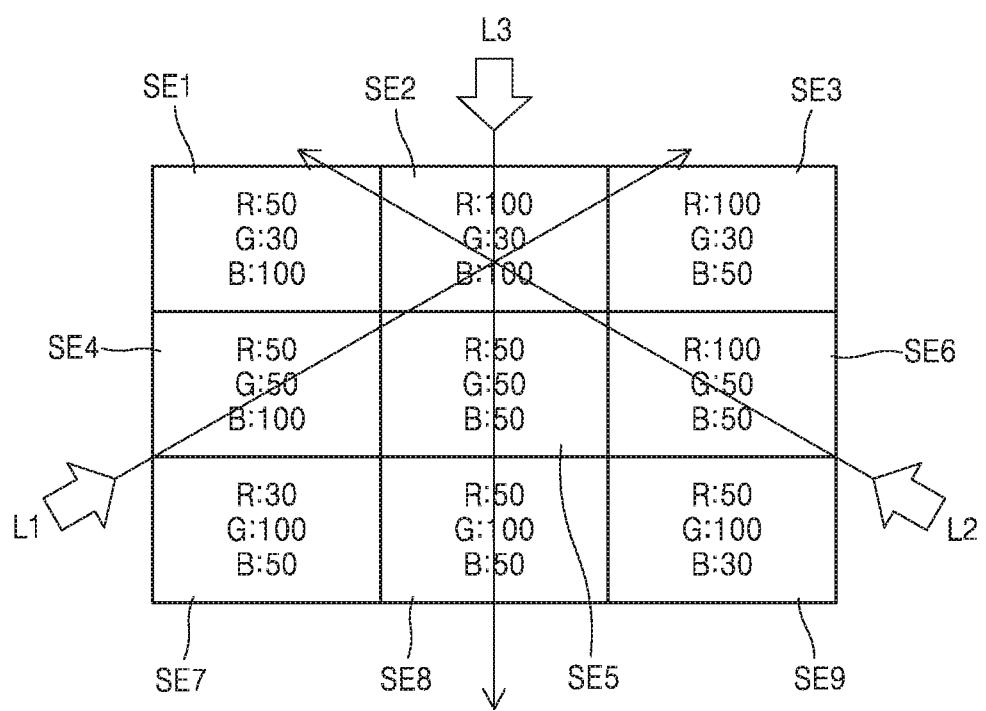
FIG. 6 is a view illustrating an area ratio of sub-grating units in each section when the diffraction device of the directional backlight unit includes nine sections according to an exemplary embodiment.

FIG. 6 illustrates an example showing how area ratios of the sub-grating units of the sections SE are set in propagation directions of first light L1, second light L2, and third light L3. For example, the first light L1 may be red light R, the second light L2 may be blue light B, and the third light L3 may be green light G. For example, in the first section SE1, the area ratio of sub-grating units corresponding to red light R, green light G, and blue light B may be 50:30:100. In the second section SE2, the area ratio of sub-grating units corresponding to red light R, green light G, and blue light B may be 100:30:100. In this manner, the sub-grating units may have different area ratios in the other sections SE. In the above, the area ratio of the sub-grating units in each section is described.

In another exemplary embodiment, sub-grating units of the sections SE corresponding to particular light may have different sizes of areas in a propagation direction of the particular light. For example, the areas of the sub-grating units of the sections SE may gradually increase in propagation directions of light corresponding to the sub-grating units. The areas of sub-grating units of the sections SE corresponding to first light L1 may gradually increase in a propagation direction of the first light L1. Referring to FIG. 6, the areas of sub-grating units of the sections SE corresponding to first light L1 are denoted by R, the areas of sub-grating units of the sections SE corresponding to second light L2 are denoted by B, and the areas of sub-grating units of the sections SE corresponding to third light L3 are denoted by G. For example, in the propagation direction of the first light L1, the area R of the first sub-grating unit of the fourth section SE4 may be 50, and the area R of the first sub-grating unit of the second section SE2 may be 100. Here, the area values may be relative values. In the propagation direction of the second light L2, the area B of the second sub-grating unit of the sixth section SE6 may be 50, and the area B of the second sub-grating unit of the second section SE2 may be 100. In the propagation direction of the third light L3, the area G of the third sub-grating unit of the second section SE2 may be 30, the area G of the third sub-grating unit of the fifth section SE5 may be 50, and the area G of the third sub-grating unit of the eighth section SE8 may be 100.

In this manner, the sizes of the areas of the sub-grating units may gradually increase in propagation directions of light corresponding to the sub-grating units. In this case, the area ratios of the sub-grating units may be variously adjusted to improve optical uniformity.

Figure 7:
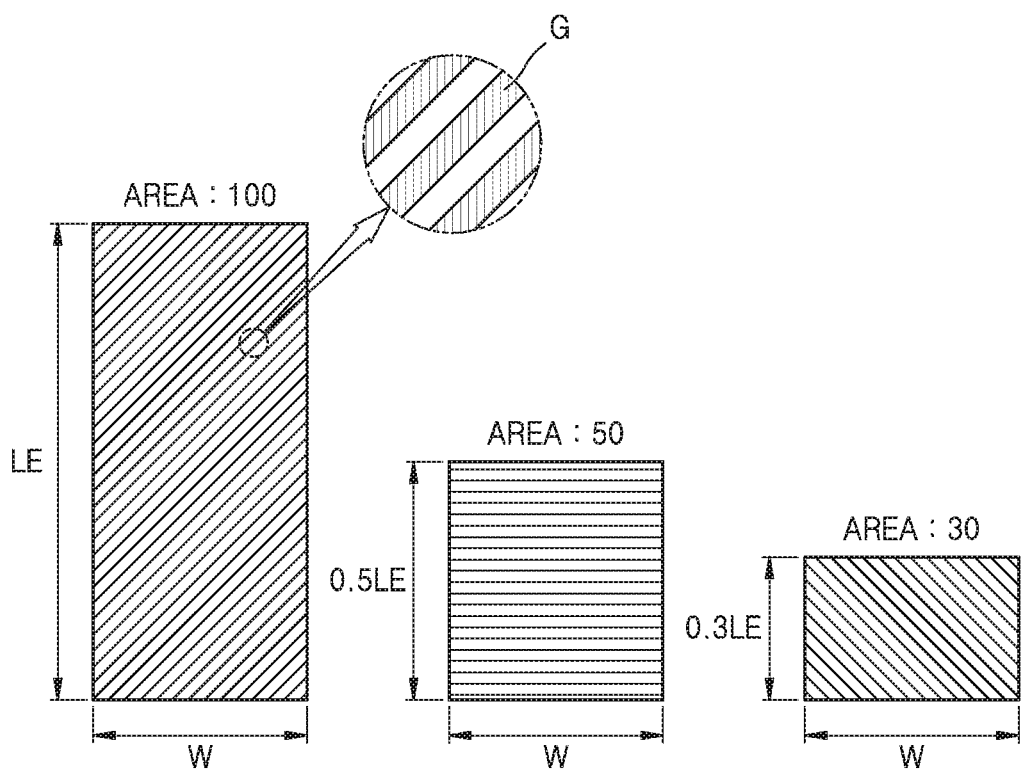
FIG. 7 is a view illustrating an example of the area ratio of sub-grating units.

Referring to FIG. 7, for example, the area of each sub-grating unit may be adjusted by varying at least one of the width W and length LE of the sub-grating unit. Here, the width W may be parallel with a horizontal direction and the length LE may be parallel with a vertical direction when a user views a 3D image display apparatus including the directional backlight unit of the exemplary embodiment. Referring to the example shown in FIG. 7, first to third sub-grating units have the same width W but different lengths LE. For example, the first to third sub-grating units may respectively have lengths LE, 0.5LE, and 0.3LE and thus an area ratio of 100:50:30. In another example, the first to third sub-grating units may respectively have lengths 0.4LE, 0.2LE, and LE and thus an area ratio of 40:20:100. The area ratios of the sub-grating units may be variously adjusted according to factors such as the number of sections SE of the diffraction device D, the angle of incidence of light, or the wavelength of light.

To adjust the area ratios of the sub-grating units, both the widths and lengths of the sub-grating units may be varied. Alternatively, either the widths or the lengths of the sub-grating units may be varied to adjust the area ratios of the sub-grating units.

As described above, in the directional backlight unit of the exemplary embodiment, the sub-grating units may have different area ratios in different sections SE of the diffraction device D. The area ratios of the sub-grating units of the sections SE may be adjusted to improve the uniformity of light output from the diffraction device D. In another exemplary embodiment, the areas of sub-grating units may be varied in a propagation direction of light corresponding to the sub-grating units. That is, in each section SE, sub-grating units corresponding to different kinds of light may have different sizes of areas, or the areas of the sub-grating units may be varied in propagation directions of different kinds of light. In this manner, the uniformity of light may be improved by adjusting the light output efficiency of a section SE relatively close to an entrance surface of light relatively to the light output efficiency of a section SE relatively distant from the entrance surface of light. Light sources may be arranged at different positions according to wavelength bands, and sub-grating units corresponding to the wavelength bands may have different sizes of areas along optical paths of the wavelength bands.

In addition, for example, the light output efficiency of each section SE may be adjusted by varying at least one of the areas of sub-grating units, and the height, pitch, width of lands, and refractive index of gratings.

Figure 8:
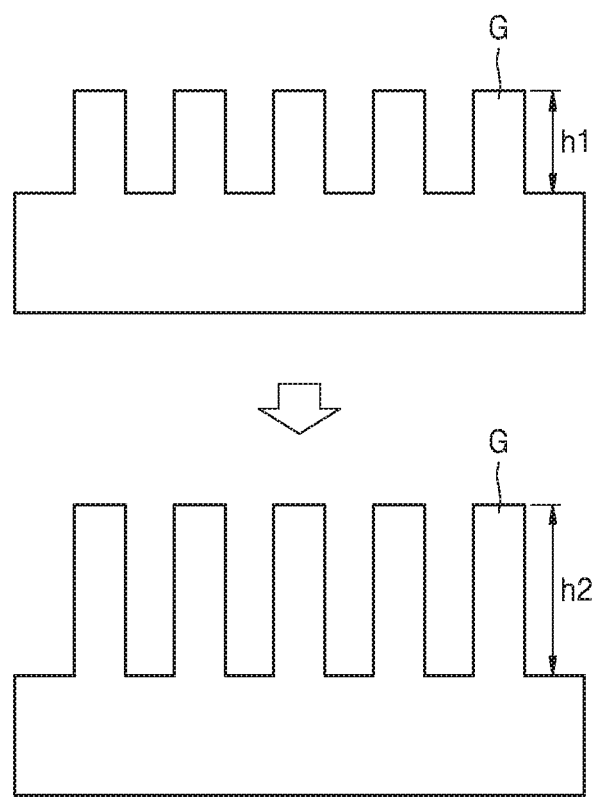
FIG. 8 is a view illustrating an example of varying the height of a grating of a diffraction device of a directional backlight unit according to an exemplary embodiment.

FIG. 8 is a cross-sectional view illustrating an example of varying the height of a grating G. The height of the grating G may be varied to adjust light output efficiency. Gratings G of grating units may have different heights h in different sections SE. Alternatively, the gratings G may be different heights h only in some sections SE. If the height h of a grating G increases, the light output efficiency of the grating G may increase. For example, gratings G of a section SE relatively close to a light source may have a first height h1, gratings G of a section SE relatively distant from the light source may have a second height h2, and the first height h1 may be less than the second height h2. Alternatively, gratings G may be set to have one of the first and second heights h1 and h2 by taking into consideration the light output efficiency of the gratings G.

Figure 9:
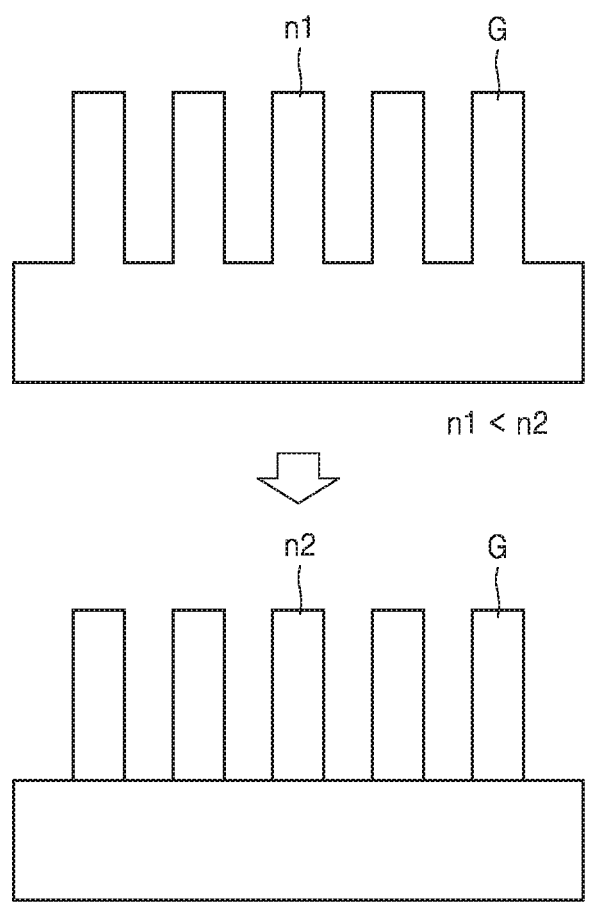
FIG. 9 is a view illustrating an example of varying the refractive index of a grating of a diffraction device of a directional backlight unit according to an exemplary embodiment.

FIG. 9 is a cross-sectional view illustrating an example of varying the refractive index of a grating G. For example, the grating G may have a first refractive index n1, 1.46. Alternatively, the grating G may have a second refractive index n2, 1.53. If the refractive index of the grating G increases, the light output efficiency of the grating G may increase. For example, the light output efficiency of the grating G may be greater when the refractive index of the grating G is 1.53 than when the refractive index of the grating G is 1.46. Light output efficiency may be adjusted by varying the refractive indexes of gratings G of sections SE of a diffraction device. Alternatively, the refractive indexes of gratings G of some sections may be set to be different from each other. For example, gratings G of a section SE relatively close to a light source may have a first refractive index n1, a grating G of a section SE relatively distant from the light source may have a second refractive index n2, and the first refractive index n1 may be less than the second refractive index n2. Alternatively, gratings G may be set to have one of the first and second refractive indexes n1 and n2 by taking into consideration the light output efficiency of the gratings G.

Figure 10:
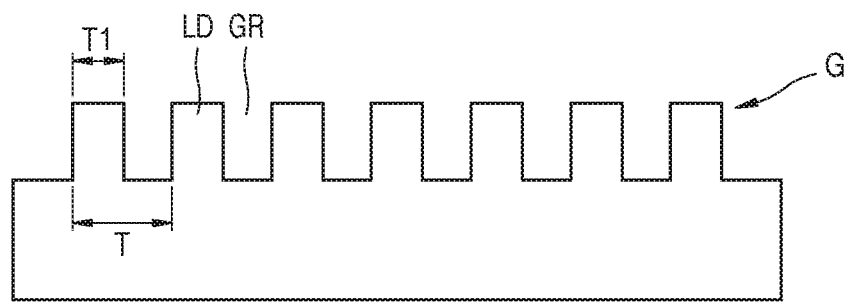
FIG. 10 is a view illustrating an example of varying the width of lands of a grating of a diffraction device of a directional backlight unit according to an exemplary embodiment.
Figure 10:
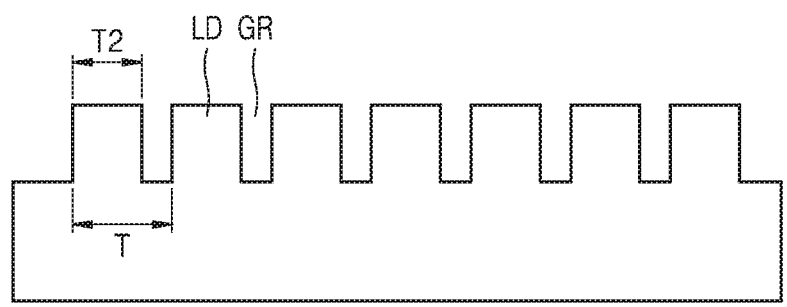
Figure 10:
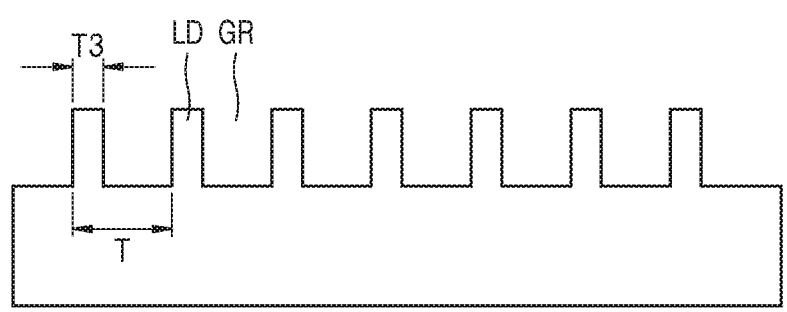

FIG. 10 illustrates an example of varying the width of lands of a grating G. The grating G may include grooves GR and lands LD. The term "duty cycle" may refer to a ratio of the width T1 of the lands LD to the pitch T of the grating G. In general, a duty cycle of 0.5 may result in the maximum light output efficiency, and a duty cycle of less than or greater than 0.5 may result in a relatively low light output efficiency. Therefore, the duty cycle of a section SE relatively distant from an entrance surface of a light guide plate may be adjusted in relation with the duty cycle of a section SE relatively close to the entrance surface of the light guide plate so that the grating of the section SE relatively distant from the entrance surface of the light guide plate may have a relatively high light output efficiency. Alternatively, the light output efficiency of gratings G may be adjusted by varying the pitch of the gratings G.

Next, operations of a directional backlight unit will be described according to an exemplary embodiment.

Figure 11:
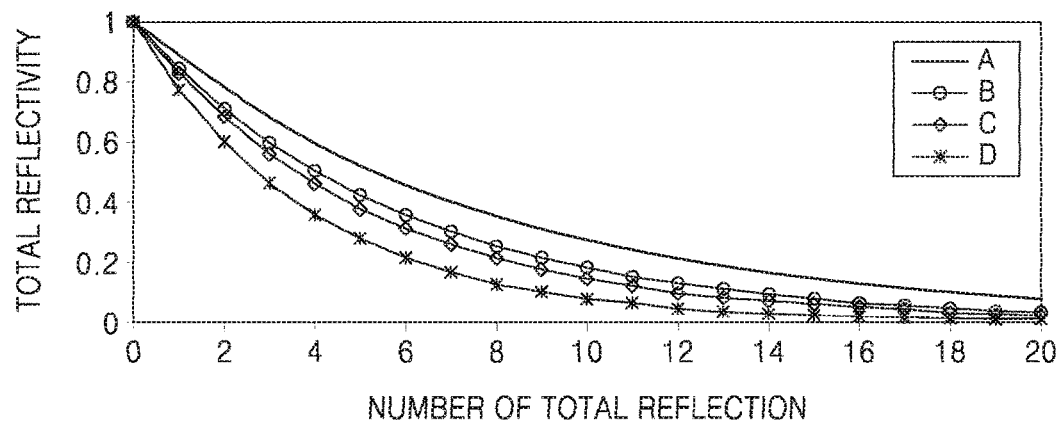
FIG. 11 is a graph illustrating the total reflectivity of red light with respect to the number of times of total reflection in backlight units including diffraction devices each constituted by a single grating pattern set according to comparative examples.

FIG. 11 is a graph illustrating the total reflectivity of red light with respect to the number of times of total reflection in backlight units including diffraction devices each constituted by a single grating pattern set according to comparative examples. The term "single grating pattern set" may refer to a grating pattern set constituted by sub-grating units having the same area.

FIG. 11 is a graph illustrating the total reflectivity with respect to the number of times of total reflection in the comparative examples. In FIG. 11, A refers to a single grating pattern set having a grating height of 100 nm and a grating refractive index of 1.46, B refers to a single grating pattern set having a grating height of 120 nm and a grating refractive index of 1.46, C refers to a single grating pattern set having a grating height of 100 nm and a grating refractive index of 1.53, and D refers to a single grating pattern set having a grating height of 120 nm and a grating refractive index of 1.53. The number of times of total reflection refers to the number of times light is totally reflected while propagating in a light guide plate, and as the number of times of total reflection increases, the distance from a light source may increase (or the distance from an entrance surface of the light guide plate may increase).

Figure 12:
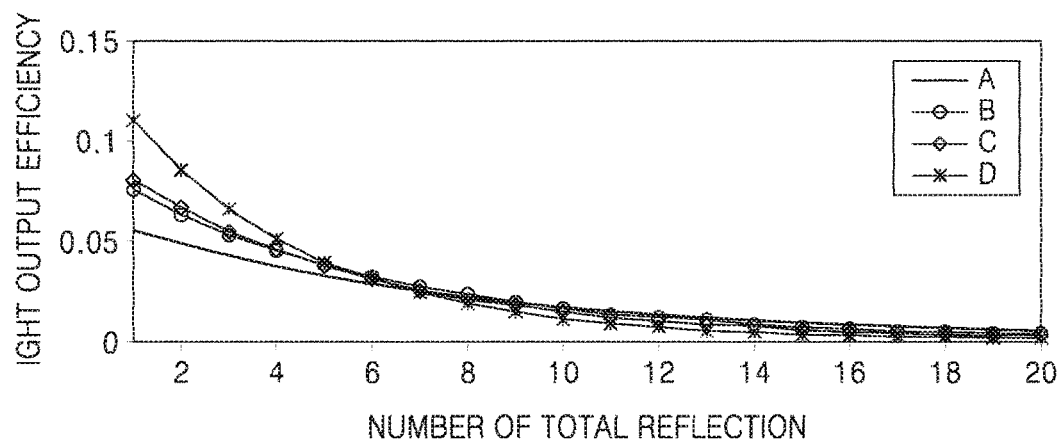
FIG. 12 is a graph illustrating red light output efficiency with respect to the number of times of total reflection in the backlight units including diffraction devices each constituted by a single grating pattern set according to the comparative examples.

The total reflectivity decreases exponentially as the number of times of total reflection increases. FIG. 12 is a graph illustrating red light output efficiency with respect to the number of times of total reflection for the cases A, B, C, and D. The red light output efficiency decreases as the number of times of total reflection increases.

Figure 13:
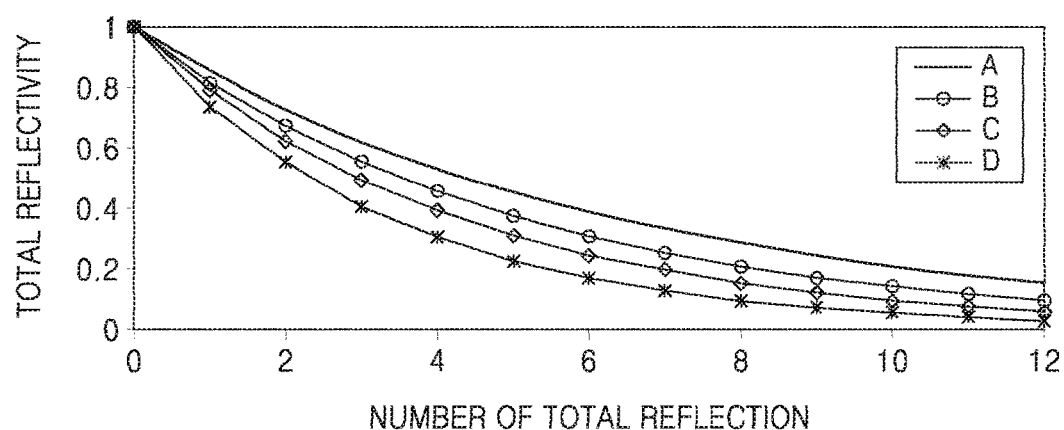
FIG. 13 is a graph illustrating the total reflectivity of green light with respect to the number of times of total reflection in the backlight units including diffraction devices each constituted by a single grating pattern set according to the comparative examples.
Figure 14:
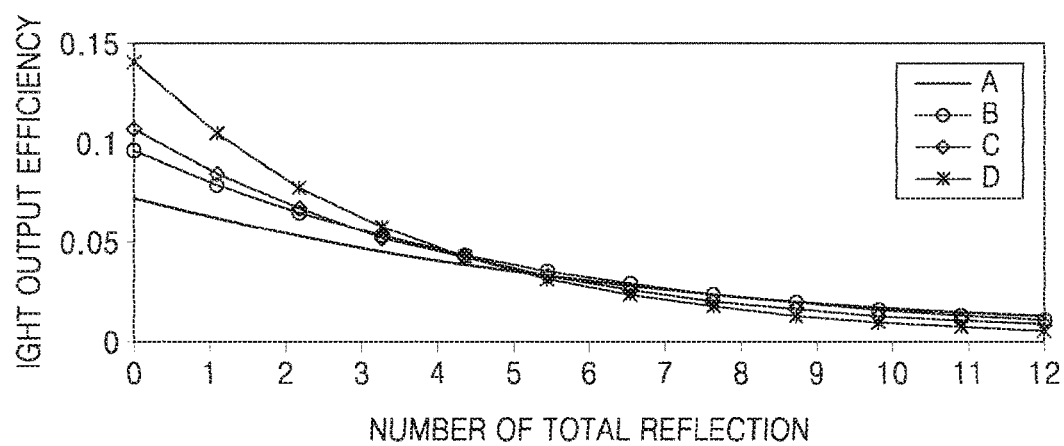
FIG. 14 is a graph illustrating green light output efficiency with respect to the number of times of total reflection in the backlight units including diffraction devices each constituted by a single grating pattern set according to the comparative examples.

FIG. 13 is a graph illustrating the total reflectivity of green light with respect to the number of times of total reflection for the cases A, B, C, and D. The total reflectivity decreases exponentially as the number of times of total reflection increases. FIG. 14 is a graph illustrating green light output efficiency with respect to the number of times of total reflection for the cases A, B, C, and D. The green light output efficiency decreases as the number of times of total reflection increases.

Figure 15:
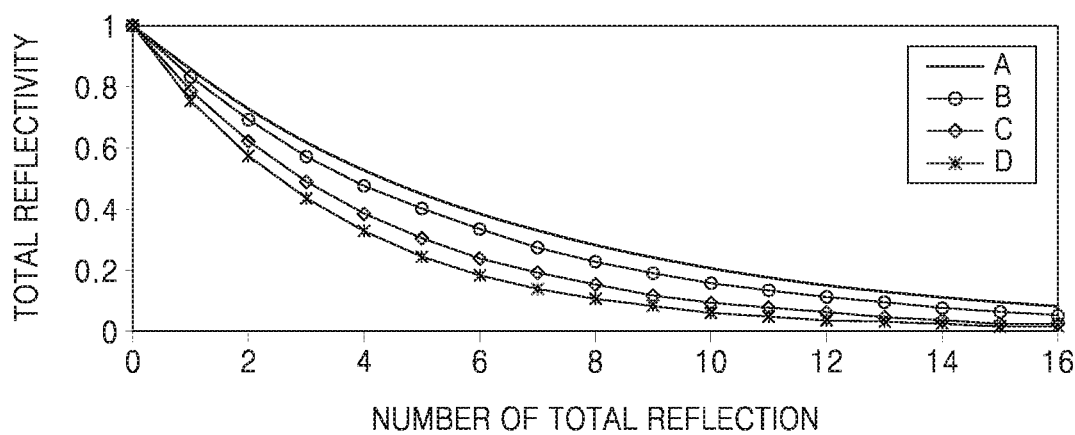
FIG. 15 is a graph illustrating the total reflectivity of blue light with respect to the number of times of total reflection in the backlight units including diffraction devices each constituted by a single grating pattern set according to the comparative examples.
Figure 16:
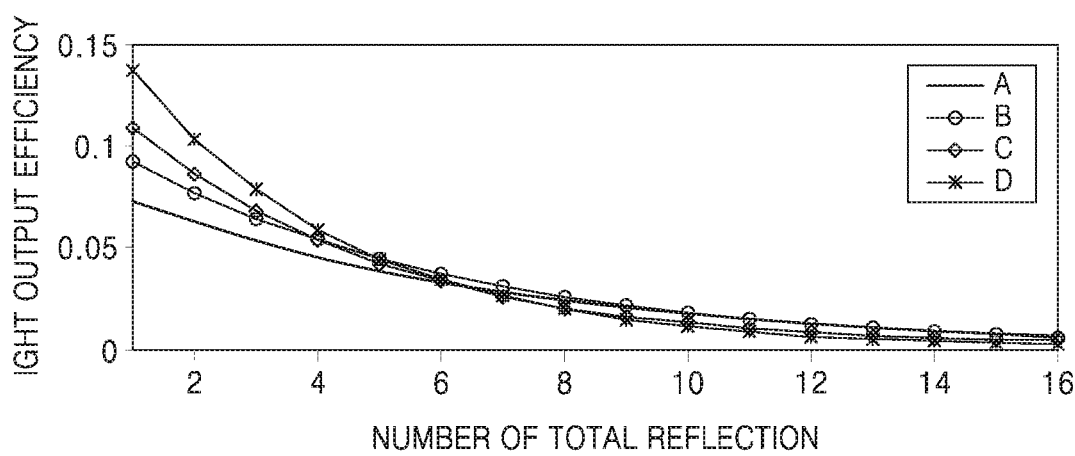
FIG. 16 is a graph illustrating blue light output efficiency with respect to the number of times of total reflection in the backlight units including diffraction devices each constituted by a single grating pattern set according to the comparative examples.

FIG. 15 is a graph illustrating the total reflectivity of blue light with respect to the number of times of total reflection for the cases A, B, C, and D. The total reflectivity decreases exponentially as the number of times of total reflection increases. FIG. 16 is a graph illustrating blue light output efficiency with respect to the number of times of total reflection for the cases A, B, C, and D. The blue light output efficiency decreases as the number of times of total reflection increases.

Figure 19:
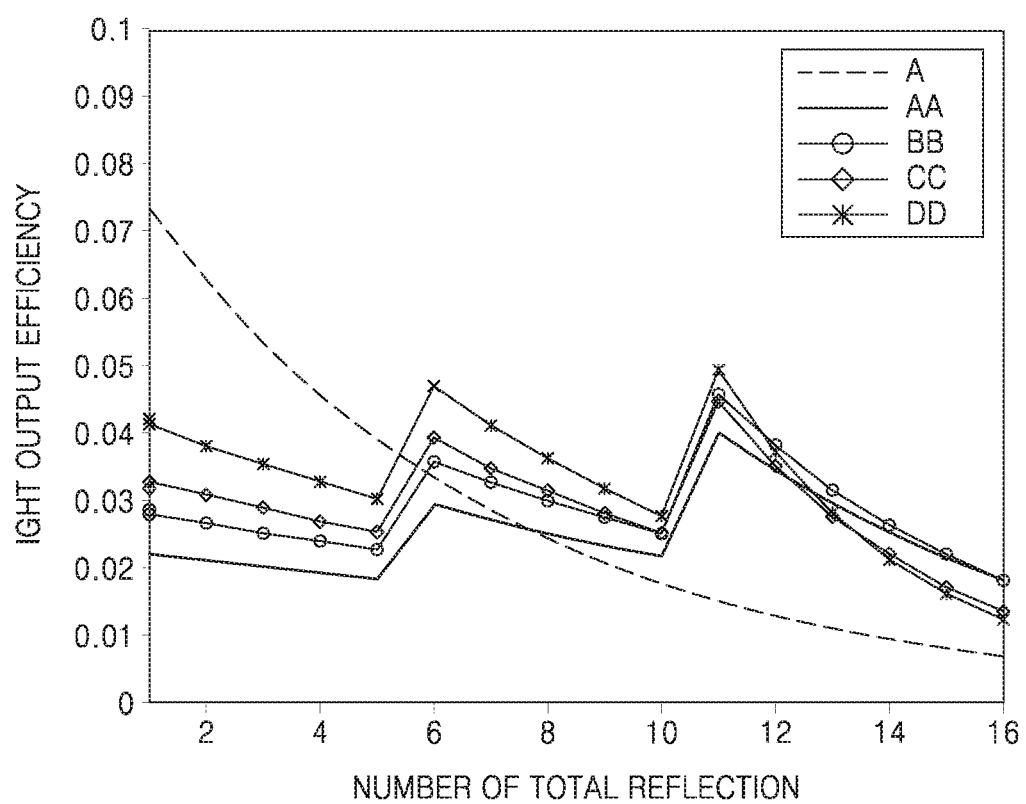
FIG. 19 is a graph illustrating blue light output efficiency with respect to the number of times of total reflection in the backlight units of the exemplary embodiments.

FIG. 19 is a graph illustrating blue light output efficiency with respect to the number of times of total reflection according to the exemplary embodiments. That is, FIG. 19 illustrates blue light output efficiency with respect to the number of times of total reflection in the cases AA, BB, CC, and DD. The output amount of blue light does not decrease exponentially as the number of times of total reflection. That is, the output amount of blue light repeatedly decreases and increases, and the blue light output efficiency is relatively uniform as a whole.

Table 1 below shows light output efficiency in comparative examples in which a single grating pattern set is used.

TABLE 1

| Light colors | Change in grating height (nm) | Change in LOE (increased amount) | Change in refractive index | Change in LOE (increased amount) | Changes in grating height & refractive index | Change in LOE (increased amount) |
|---|---|---|---|---|---|---|
| Red | 100 → 110 | 19% | 1.46 → 1.50 | 25% | Height 100 → 120 | 100% |
|  | 100 → 120 | 38% | 1.46 → 1.53 | 46% |  |  |
| Green | 100 → 110 | 16% | 1.46 → 1.50 | 25% | Refractive index 1.46 → 1.53 | 94% |
|  | 100 → 120 | 32% | 1.46 → 1.53 | 47% |  |  |
| Blue | 100 → 110 | 14% | 1.46 → 1.50 | 26% |  | 87% |
|  | 100 → 120 | 30% | 1.46 → 1.53 | 49% |  |  |

*LOE: light output efficiency

Referring to the graphs, the output efficiency of red light, green light, and blue light decreases as the number of times of total reflection increases. This may mean that the light output efficiency of a region of a light guide plate relatively distant from a light entrance surface is less than the light output efficiency of a region of the light guide plate relatively close to the light entrance surface.

Figure 17:
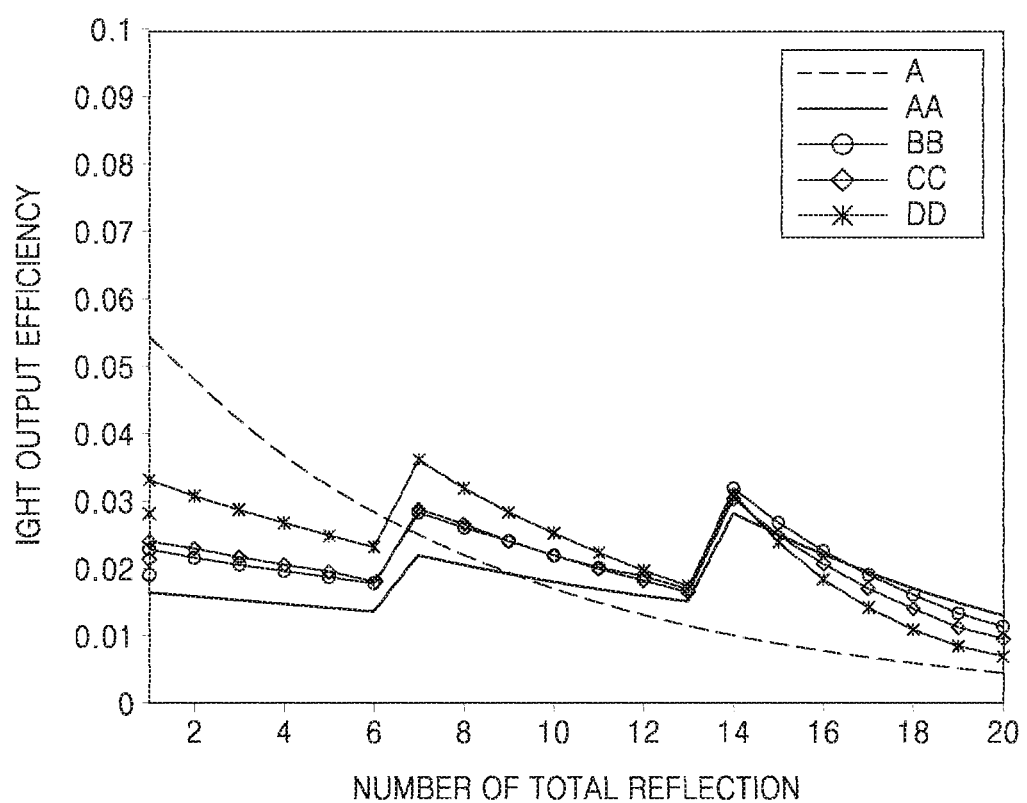
FIG. 17 is a graph illustrating green light output efficiency with respect to the number of times of total reflection in backlight units of exemplary embodiments.

FIG. 17 is a graph illustrating red light output efficiency with respect to the number of times of total reflection in directional backlight units according to exemplary embodiments. Each of the directional backlight units of the exemplary embodiments may include nine sections. In the graph shown in FIG. 17, AA refers to multiple grating pattern sets having area ratios shown in FIG. 6 in nine sections, a grating height of 100 nm, and a grating refractive index of 1.46; BB refers to multiple grating pattern sets having area ratios shown in FIG. 6 in nine sections, a grating height of 125 nm, and a grating refractive index of 1.46; CC refers to multiple grating pattern sets having area ratios shown in FIG. 6 in nine sections, a grating height of 125 nm, and a grating refractive index of 1.53; and DD refers to multiple grating pattern sets having area ratios shown in FIG. 6 in nine sections, a grating height of 125 nm, and a grating refractive index of 1.53. Referring to FIG. 17, when compared to the case A of using the single grating pattern set in the comparative example, the output amount of red light does not decrease exponentially as the number of times of total reflection increases in the cases AA, BB, CC, and DD. That is, the output amount of red light repeatedly decreases and increases, and the red light output efficiency is relatively uniform as a whole.

Figure 18:
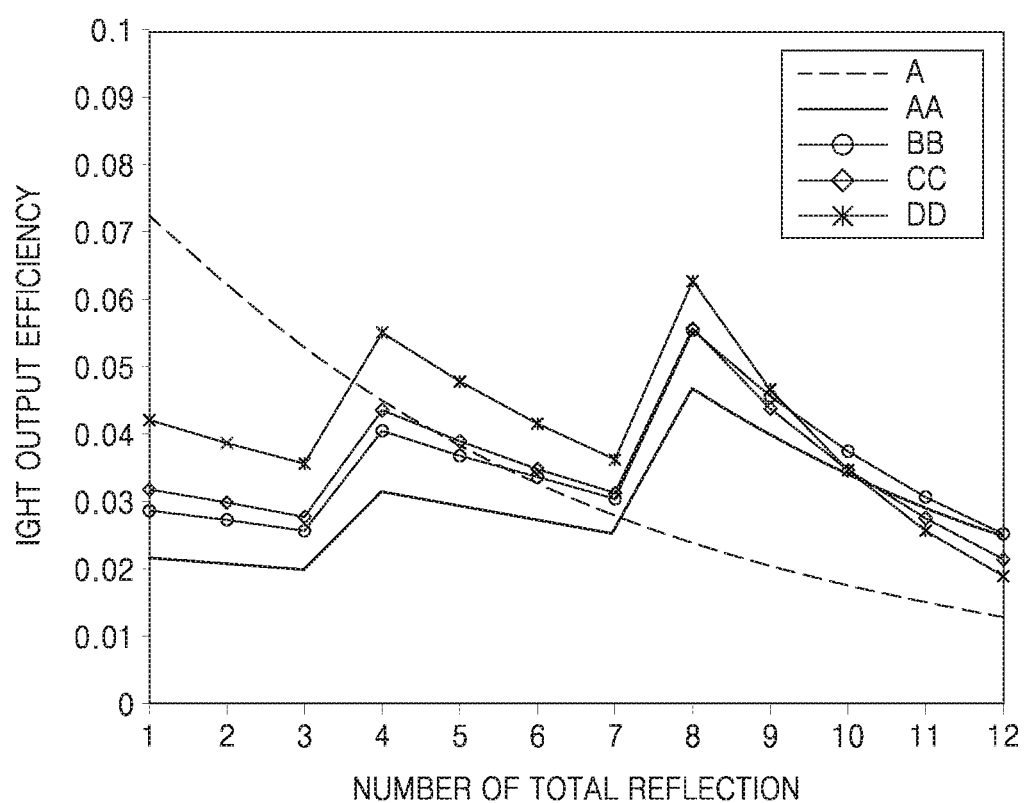
FIG. 18 is a graph illustrating red light output efficiency with respect to the number of times of total reflection in the backlight units of the exemplary embodiments.

FIG. 18 is a graph illustrating green light output efficiency with respect to the number of times of total reflection according to the exemplary embodiments. That is, FIG. 18 illustrates green light output efficiency with respect to the number of times of total reflection in the cases AA, BB, CC, and DD. The output amount of green light does not decrease exponentially as the number of times of total reflection. That is, the output amount of green light repeatedly decreases and increases, and the green light output efficiency is relatively uniform as a whole.

For example, red light output efficiency may be increased by about 19% in the case of using a single grating pattern set having a grating height of 110 nm and a grating refractive index of 1.46, compared to the case of using a single grating pattern set having a grating height of 100 nm and a refractive index of 1.46. In the same case, green light output efficiency may be increased by about 16%, and blue light output efficiency may be increased by about 14%. For example, red light output efficiency may be increased by about 38% in the case of using a single grating pattern set having a grating height of 120 nm, compared to the case of using a single grating pattern set having a grating height of 100 nm. In the same case, green light output efficiency may be increased by about 32%, and blue light output efficiency may be increased by about 30%. That is, the height of gratings has an effect on light output efficiency.

For example, red light output efficiency may be increased by about 25% in the case of using a single grating pattern set having a grating refractive index of 1.50, compared to the case of using a single grating pattern set having a grating refractive index of 1.46. In the same case, green light output efficiency may be increased by about 25%, and blue light output efficiency may be increased by about 26%. For example, red light output efficiency may be increased by about 46% in the case of using a single grating pattern set having a grating refractive index of 1.53, compared to the case of using a single grating pattern set having a grating refractive index of 1.46. In the same case, green light output efficiency may be increased by about 47%, and blue light output efficiency may be increased by about 49%. That is, the refractive index of gratings has an effect on light output efficiency.

For example, red light output efficiency may be increased by about 100% in the case of using a single grating pattern set having a grating height of 120 nm and a grating refractive index of 1.53, compared to the case of using a single grating pattern set having a grating height of 100 nm and a refractive index of 1.46. In the same case, green light output efficiency may be increased by about 94%, and blue light output efficiency may be increased by about 87%. If both the height and refractive index of gratings are adjusted, light output efficiency may be increased more than the case of adjusting only one of the height and refractive index of a grating.

Although light output efficiency is increased as described above, the light output efficiency difference between a region of a light guide plate relatively close to an light entrance surface and a region of the light guide plate relatively distant from the light entrance surface may not be decreased. In other words, although light output efficiency increases, light uniformity may not increase.

Table 2 below shows results of light uniformity simulations performed on a diffraction device having a single grating pattern set according to a comparative example and diffraction devices having multiple grating pattern sets according to exemplary embodiments.

TABLE 2

| Items | | Configurations | Red light | Green light | Blue light |
|---|---|---|---|---|---|
| Single grating pattern set | | h: 100 nm<br>n: 1.46 | 8.53% | 17.69% | 9.41% |
| Multiple grating pattern sets (9 sections) | Case (1) | h: 100 nm<br>n: 1.46 | 45.97% | 42.46% | 45.48% |
| | Case (2) | h: 100 → 120 nm<br>n: 1.46 | 35.69% | 45.23% | 39.63% |
| | Case (3) | h: 100 nm<br>n: 1.46 → 1.53 | 31.26% | 38.75% | 30.19% |
| | Case (4) | h: 100 → 120 nm<br>n: 1.46 → 1.53 | 18.36% | 30.15% | 24.69% |

The single grating pattern set has a grating height of 100 nm and grating refractive index of 1.46, and sub-grating patterns of the single grating pattern set have the same areas. Here, light uniformity may be a ratio of the minimum to the maximum of light output efficiency. The single grating pattern set may have a light uniformity of about 8.53% for red light, about 17.69% for green light, and about 9.41% for blue light.

Case (1) refers to a diffraction device divided into nine sections and having multiple grating pattern sets shown in FIG. 6 with a grating height of 100 nm and a grating refractive index of 1.46. In Case (1), red light uniformity is about 45.97%, green light uniformity is about 42.46%, and blue light uniformity is about 45.48%. In Case (2), the grating height is increased from 100 nm to 120 nm compared to Case (1). In Case (2), red light uniformity is about 35.69%, green light uniformity is about 45.23%, and blue light uniformity is about 39.63%. In Case (3), the grating refractive index is increased from 1.46 nm to 1.53 nm compared to Case (1). In Case (3), red light uniformity is about 31.26%, green light uniformity is about 38.75%, and blue light uniformity is about 30.19%. In Case (4), the grating height is increased from 100 nm to 120 nm, and the grating refractive index is increased from 1.46 to 1.53, compared to Case (1). In Case (4), red light uniformity is about 18.36%, green light uniformity is about 30.15%, and blue light uniformity is about 24.69%.

Referring to Table 2, light uniformity increases in Cases (1), (2), (3), and (4) compared to the comparative example. Red light uniformity and blue light uniformity are greatest in Case (1), and green light uniformity is greatest in Case (2).

Table 3 below shows the output amounts of light for the case of using the single grating pattern set and Cases (1), (2), (3), and (4).

TABLE 3

| | Single grating pattern set | Case (1) | Case (2) | Case (3) | Case (4) |
|---|---|---|---|---|---|
| Red light | 38.7 | 34.2 | 40.0 | 39.3 | 44.2 |
| Green light | 37.9 | 32.7 | 39.0 | 39.5 | 45.6 |
| Blue light | 42.3 | 37.6 | 43.5 | 43.9 | 49.7 |

Referring to Table 3, the output amount of light is greatest in Case (4).

At least one of the area ratio, refractive index, and grating height of sub-grating units may be varied by taking into consideration the output amount of light and the uniformity of light.

Figures 20, 21:
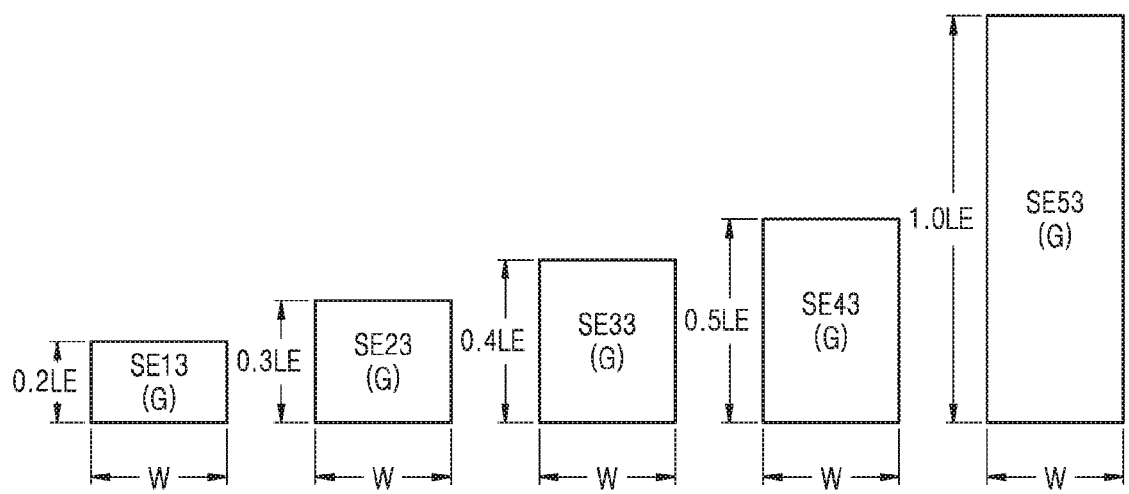
FIG. 20 is a view illustrating the area ratio of sub-grating units in each of twenty five sections of a diffraction device of a backlight unit according to an exemplary embodiment.
FIG. 21 is a view illustrating areas of sub-grating units in the third column of the sections of the diffraction device depicted in FIG. 20, according to an exemplary embodiment.

FIG. 20 is a view illustrating a directional backlight unit having twenty five sections (5×5 sections) according to an exemplary embodiment. In FIG. 20, each section is denoted as SEnm where n and m are integers. In each section, the area fraction of a sub-grating unit corresponding to green light is shown as an example. For example, as shown in FIG. 20, five sections in the third column of the 5×5 sections may have an area ratio of sub-grating units corresponding to green light, SE13(G):SE23(G):SE33(G):SE43(G):SE53(G) =0.2:0.3:0.4:0.5:1.0. For example, green light may be incident on a light guide plate in a direction perpendicular to the light guide plate. In this case, the green light may propagate in a direction parallel with columns of the 5×5 sections. Therefore, the area ratio of sub-grating units corresponding to the green light may be equal in the columns. For example, five sections in the second column of the 5×5 sections may have an area ratio of sub-grating units corresponding to green light, SE13(G):SE23(G):SE33(G):SE43(G):SE53(G) =0.2:0.3:0.4:0.5:1.0. However, the inventive concept is not limited thereto. For example, the sub-grating units of the sections may have different area ratios in the propagation direction of light.

FIG. 21 diagrammatically illustrates an example in which the five sections in the third column of the 5×5 sections have an area ratio of sub-grating units corresponding to green light, SE13(G):SE23(G):SE33(G):SE43(G):SE53(G)=0.2: 0.3:0.4:0.5:1.0. The widths of the sub-grating units may be fixed to a value W, and the lengths of the sub-grating units may be varied to adjust the areas of the sub-grating units. For example, the lengths of the five sub-grating units corresponding to green light may be adjusted to be 0.2LE, 0.3LE, 0.4LE, 0.5LE, and 1.0LE, respectively, so as to obtain an area ratio of 0.2:0.3:0.4:0.5:1.0. Alternatively, the lengths of the sub-grating units may be fixed to the same value, and the widths of the sub-grating units may be varied so as to adjust the area ratio of the sub-grating units. Alternatively, both the lengths and width of the sub-grating units may be varied so as to adjust the area ratio of the sub-grating units.

In the above, the area ratio of the sub-grating units corresponding to green light is described. However, the area ratio of sub-grating units corresponding to red light may be differently adjusted in a propagation direction of red light, and the area ratio of sub-grating units corresponding to blue light may be differently adjusted in a propagation direction of blue light. In this manner, sub-grating units corresponding to different light colors may be adjusted to have different area ratios according to the number of sections.

Figure 22:
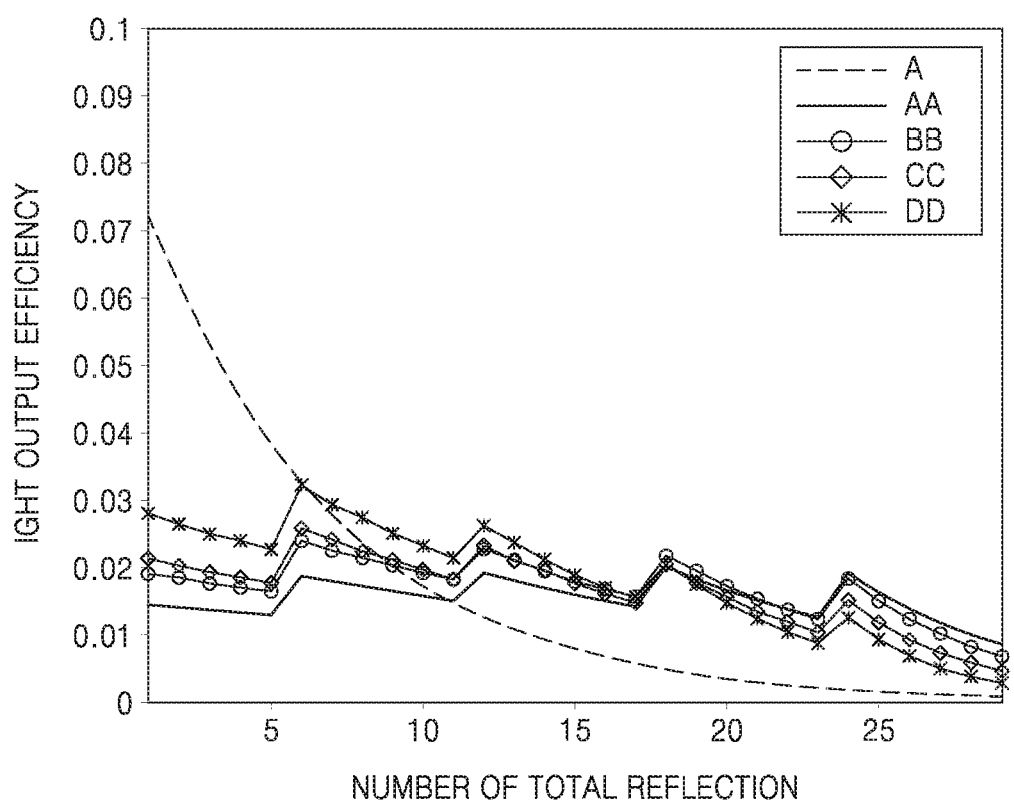
FIG. 22 is a graph illustrating green light output efficiency with respect to the number of times of total reflection in backlight units each including twenty five sections according to exemplary embodiments.

FIG. 22 is a graph illustrating green light output efficiency for the case of 5×5 sections. The green light output efficiency is shown with respect to the number of times of total reflection. In case (A) in which a single grating pattern set is used, the green light output efficiency decreases exponentially. However, when sub-grating units corresponding to green light have different sizes of areas, the green light output efficiency is relatively uniform. AA, BB, CC, and DD refer to cases in which factors such as grating heights and refractive indexes are equal to those described with reference to FIG. 17 except that the number of sections is varied from nine to twenty five.

As described above, in the directional backlight units of the embodiments, the sub-grating units of each grating unit may have different sizes of areas in different sections of the diffraction device. For example, the sub-grating units of each grating unit may have different area ratios in different sections. In another example, sub-grating units corresponding to particular color light may have different sizes of areas in a propagation direction of the particular color light. In this case, the areas of the sub-grating units corresponding to the particular color light may increase in the propagation direction of the particular color light. Therefore, the uniformity of light output from the light guide plate may be improved. In the case of a large light guide plate, the output amount of light in a region relatively close to a light entrance surface of the light guide plate may be considerably different from the output amount of light in a region relatively distant from the light entrance surface of the light guide plate. Therefore, it may be more difficult to ensure the optical uniformity of a large light guide plate. In this case, the uniformity of light may be improved if sub-grating units of a diffraction device have different sizes of areas. In addition to adjusting the area ratios of sub-grating units, at least one of the height, refractive index, and duty cycle may be adjusted to further improve the uniformity of light.

In the embodiments, the light guide plate LGP and the diffraction device D may be separately manufactured and then be combined. Alternatively, the light guide plate LGP and the diffraction device D may be manufactured as one piece. For example, the diffraction device D may be provided by forming gratings G in a side of the light guide plate LGP. For example, the gratings G may be formed by a nanoimprinting lithography method. However, the inventive concept is not limited thereto. That is, gratings G may be formed by various methods.

Figure 23:
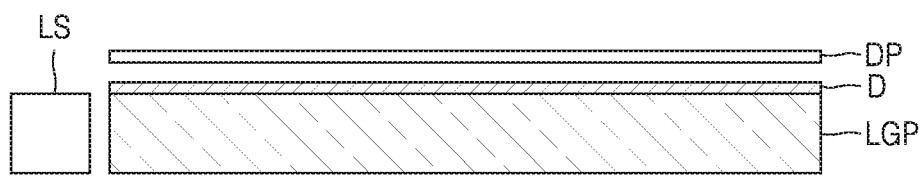
FIG. 23 is a view schematically illustrating a three-dimensional (3D) image display apparatus including a directional backlight unit according to an exemplary embodiment.

FIG. 23 is a view schematically illustrating a 3D image display apparatus according to an embodiment. The 3D image display apparatus may include a light source LS, a light guide plate LGP guiding light emitted from the light source LS, a diffraction device D provided on the light guide plate LGP, and a display panel DP displaying images. The light source LS, the light guide plate LGP, and the diffraction device D are substantially the same as those illustrated with reference to FIGS. 1 to 22, and thus detailed descriptions thereof will not be presented here. For example, the display panel DP may include a liquid crystal display. For example, the display panel DP may include a plurality of pixels arranged in a matrix form, and each of the pixels may include sub-pixels each corresponding to color light. For example, the 3D image display apparatus may display twenty views. Here, the term "view" may refer to an image provided to one eye of a viewer. However, the inventive concept is not limited thereto. For example, an image realizing two or more views may be provided to one eye of a viewer. For example, for the case of displaying twenty views, the diffraction device D may include grating pattern sets each having grating units corresponding to twenty views.

When light emitted from the light source LS passes through the diffraction device D in a direction toward the display panel DP, the diffraction device D may adjust the direction of the light according to at least one of the angle of incidence of the light to the light guide plate LGP and the wavelength of the light, and thus 3D images may be displayed. The areas of sub-grating units of the diffraction device D may be varied according to regions of the diffraction device D, so as to improve the uniformity of light exiting the diffraction device D.

Figure 24:
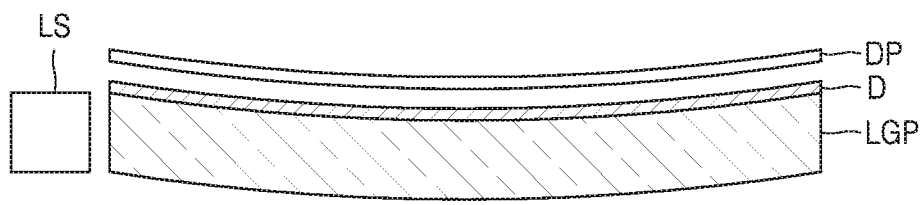
FIG. 24 is a view schematically illustrating a 3D image display apparatus including a directional backlight unit according to another exemplary embodiment.

Referring to FIG. 24, a 3D image display apparatus having a curved shape may be manufactured. For example, a light guide plate LGP, a diffraction device D, and a display panel DP having curved shapes may be manufactured to display images more naturally.

Figure 25:
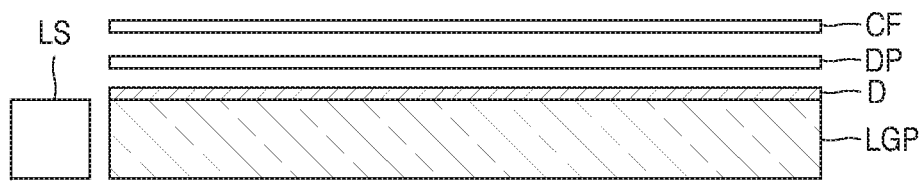
FIG. 25 is a view illustrating an example in which the 3D image display apparatus depicted in FIG. 23 further includes a color filter.

FIG. 25 illustrates a 3D image display apparatus further including a color filter CF compared to the 3D image display apparatus illustrated in FIG. 23. For example, the color filter CF may be arranged to face a light output surface of a display panel DP. The display panel DP may express grayscale, and the color filter CF may express colors, so as to display 3D color images.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A directional backlight unit comprising:
   a light source;
   a light guide plate comprising an entrance surface receiving light emitted from the light source, the light guide plate guiding the light emitted from the light source; and
   a diffraction device comprising a plurality of sections, each of the sections comprising a grating pattern set configured to adjust a direction of light exiting the light guide plate,
   wherein the grating pattern set comprises a plurality of grating units, and the grating units comprise a plurality of sub-grating units dependent on a waveband of light and arranged next to each other, and
   wherein at least one of the area size, area ratio, refractive index, and grating height of the plurality of sub-grating units is configured to adjust an output amount of light in a section of the diffraction device at a first distance from the entrance surface of the light guide plate among the plurality of sections, and adjust an output amount of light in a section of the diffraction device at a second distance from the entrance surface of the light guide plate among the plurality of sections, the second distance being greater than the first distance.

2. The directional backlight unit of claim 1, wherein the plurality of grating units comprises a first sub-grating unit corresponding to a red wavelength band, a second sub-grating unit corresponding to a green wavelength band, and a third sub-grating unit corresponding to a blue wavelength band,
wherein the first sub-grating unit has an area of a first size, the second sub-grating unit has an area of a second size, and the third sub-grating unit has an area of a third size, and
wherein the first size, the second size, and the third size are different from each other.

3. The directional backlight unit of claim 1, wherein the plurality of sub-grating units in each of the plurality of sections has different sizes of areas.

4. The directional backlight unit of claim 1, wherein sizes of areas of the plurality of sub-grating units increase in a propagation direction of the light incident from the light guide plate.

5. The directional backlight unit of claim 4, wherein widths of the sub-grating units increase in the propagation direction of the light incident from the light guide plate.

6. The directional backlight unit of claim 1, wherein the plurality of sub-grating units respectively corresponds to a plurality of color light beams, and sizes of areas of the plurality of sub-grating units increase respectively in propagation directions of the plurality of color light beams.

7. The directional backlight unit of claim 1, wherein a height of the plurality of grating units in one of the plurality of sections at a first distance from the entrance surface of the light guide plate is greater than a height of the plurality of grating units in another one of the plurality of sections at a second distance from the entrance surface of the light guide plate, the first distance being greater than the second distance.

8. The directional backlight unit of claim 1, wherein a refractive index of the plurality of grating units in one of the plurality of sections at a first distance from the entrance surface of the light guide plate is greater than a refractive index of the plurality of grating units in another one of the plurality of sections which is at a second distance the entrance surface of the light guide plate, the first distance being greater than the second distance.

9. The directional backlight unit of claim 1, wherein a first duty cycle of the plurality of grating units in a first section of the plurality of sections at a first distance from the entrance surface of the light guide plate is adjusted to have a light output efficiency greater than a light output efficiency obtained by a second duty cycle of the plurality of grating units in a second section of the plurality of sections at a second distance from the entrance surface of the light guide plate, the first distance being greater than the second distance, and
wherein the first duty cycle corresponds to a ratio of a land width to a pitch of the plurality of grating units in the first section of the plurality of sections, and the second duty cycle corresponds to a ratio of a land width to a pitch of the plurality of grating units in the second section of the plurality of sections.

10. The directional backlight unit of claim 1, wherein at least one of a refractive index, a height, a pitch, and a duty cycle of each of the plurality of grating units is different from each other.

11. The directional backlight unit of claim 1, wherein the plurality of grating units has different area sizes according to a direction of the incident light and a number of the plurality of sections.

12. A directional backlight unit comprising:
a plurality of light sources emitting color light beams;
a light guide plate that comprises a plurality of entrance surfaces respectively receiving the color light beams emitted from the light sources and guides the color light beams emitted from the light sources; and
a diffraction device comprising a plurality of sections, each of the plurality of sections comprising a plurality of grating units configured to adjust a direction of the light exiting the light guide plate,
wherein each of the plurality of grating units comprises sub-grating units respectively corresponding to the color light beams, and areas of the sub-grating units corresponding to a color light beam of the color light beams vary in a propagation direction of the color light beam, and
wherein the sub-grating units in a same grating unit are arranged next to each other and sizes of areas of the sub-grating units corresponding to a same color light beams are different in different sections and increase in directions away from the entrance surfaces of the light guide plate.

13. The directional backlight unit of claim 12, wherein areas of the sub-grating units corresponding to the same color light beams increase respectively in propagation directions of the same color light beams.

14. The directional backlight unit of claim 12, wherein the sub-grating units have a same length and different widths increasing in propagation directions of the color light beams corresponding to the sub-grating units.

15. The directional backlight unit of claim 12, wherein each of the plurality of grating units comprises first sub-grating units corresponding to red light, second sub-grating units corresponding green light, and third sub-grating units corresponding to blue light, and
sizes of areas of the first sub-grating units increase in a propagation direction of the red light, sizes of areas of the sub-second grating units increase in a propagation direction of the green light, and sizes of areas of the third sub-grating units increase in a propagation direction of the blue light.

16. The directional backlight unit of claim 12, wherein a height of the plurality grating units in one of the plurality of sections at a first distance from the entrance surfaces of the light guide plate is greater than a height of the plurality of grating units in another one of the plurality of sections which is at a second distance from the entrance surfaces of the light guide plate, the first distance being greater than the second distance.

17. The directional backlight unit of claim 12, wherein a refractive index of the plurality of grating units in one of the plurality of sections at a first distance from the entrance surfaces of the light guide plate is greater than a refractive index of the plurality of grating units in another one of the plurality of sections at a second distance from the entrance surfaces of the light guide plate, the first distance being greater than the second distance.

18. The directional backlight unit of claim 12, wherein a first duty cycle of the plurality of grating units in a first section of the plurality of sections at a first distance from the entrance surfaces of the light guide plate is adjusted to have a light output efficiency greater than a light output efficiency obtained by a second duty cycle of the plurality of grating units in a second section of the plurality of sections at a second distance from the entrance surfaces of the light guide plate, the first distance being greater than the second distance, and wherein the first duty cycle corresponds to a ratio of a land width to a pitch of the plurality of grating units in the first section of the plurality of sections, and the second duty cycle corresponds to a ratio of a land width to a pitch of the plurality of grating units in the second section of the plurality of sections.

19. The directional backlight unit of claim 12, wherein at least one of a refractive index, a height, a pitch, and a duty cycle of each of the plurality of grating units is different from each other so as to adjust a light output efficiency and a light uniformity.

20. A three-dimensional (3D) image display apparatus comprising:
 a light source;
 a light guide plate that comprises an entrance surface receiving light emitted from the light source and guides the light emitted from the light source;
 a diffraction device comprising a plurality of sections, each of the plurality of sections comprising a grating pattern set configured to adjust a direction of the light exiting the light guide plate; and
 a display panel configured to generate images based on the light output from the diffraction device,
 wherein the grating pattern set comprises a plurality of grating units, and the plurality of grating units comprises a plurality of sub-grating units dependent on a wavelength band areas and arranged next to each other, and
 wherein at least one of the area size, area ratio, refractive index, and grating height of the plurality of sub-grating units is configured to adjust an output amount of light in a section of the diffraction device at a first distance from the entrance surface of the light guide plate among the plurality of sections, and adjust an output amount of light in a section of the diffraction device at a second distance from the entrance surface of the light guide plate among the plurality of sections, the second distance being greater than the first distance.

21. The 3D image display apparatus of claim 20, wherein the plurality of grating units comprises a first sub-grating unit corresponding to a red wavelength band, a second sub-grating unit corresponding to a green wavelength band, and a third sub-grating unit corresponding to a blue wavelength band,
 wherein the first sub-grating unit has an area of a first size, the second sub-grating unit has an area of a second size, and the third sub-grating unit has an area of a third size, and
 wherein the first size, the second size, and the third size are different from each other.

22. The 3D image display apparatus of claim 20, wherein the plurality of sub-grating units in each of the plurality of sections have different sizes of areas.

23. The 3D image display apparatus of claim 20, wherein sizes of areas of the plurality of sub-grating units increase in a propagation direction of the light incident from the light guide plate.

24. The 3D image display apparatus of claim 23, wherein widths of the plurality of sub-grating units increase in the propagation direction of the light incident from the light guide plate.

25. The 3D image display apparatus of claim 20, wherein the plurality of grating units respectively correspond to a plurality of color light beams, and sizes of areas of the plurality of sub-grating units increase respectively in propagation directions of the plurality of color light beams.

26. The 3D image display apparatus of claim 20, wherein a height of the plurality of grating units in one of the plurality of sections at a first distance from the entrance surface of the light guide plate is greater than a height of the plurality of grating units in another one of the plurality of sections at a second distance from the entrance surface of the light guide plate, the first distance being greater than the second distance.

27. The 3D image display apparatus of claim 20, wherein a refractive index of the plurality of grating units in one of the plurality of sections at a first distance from the entrance surface of the light guide plate is greater than a refractive index of the plurality of grating units in another one of the plurality of sections at a second distance from the entrance surface of the light guide plate, the first distance being greater than the second distance.

28. The 3D image display apparatus of claim 20, wherein a first duty cycle of the plurality of grating units in a first section of the plurality of sections at a first distance from the entrance surface of the light guide plate is adjusted to have a light output efficiency greater than a light output efficiency obtained by a second duty cycle of the plurality of grating units in a second section of the plurality of sections at a second distance from the entrance surface of the light guide plate, the first distance being greater than the second distance, and
 wherein the first duty cycle corresponds to a ratio of a land width to a pitch of the plurality of grating units in the first section of the plurality of sections, and the second duty cycle corresponds to a ratio of a land width to a pitch of the plurality of grating units in the second section of the plurality of section.

29. The 3D image display apparatus of claim 20, wherein at least one of a refractive index, a height, a pitch, and a duty cycle of each of the plurality of grating units is different from each other.

30. The 3D image display apparatus of claim 20, wherein the sub-grating units of the grating units have different area ratios according to a direction of incident light and the number of the sections of the diffraction device.

31. A directional backlight unit comprising;
 at least one light source configured to emit a first light in a first propagation direction, a second light in a second propagation direction, and a third light in a third propagation direction;
 a plurality of first sub grating units that corresponds to a wavelength band of the first light and is arranged to have sizes of areas of the plurality of first sub grating units increase in the first propagation direction,
 a plurality of second sub grating units that corresponds to a wavelength band of the second light and is arranged to have sizes of areas of the plurality of second sub grating units increase in the second propagation direction;
 a plurality of third sub grating units that corresponds to a wavelength band of the third light and is arranged to have sizes of areas of the plurality of third sub grating units increase in the third propagation direction; and
 a plurality of sections that is arranged in a matrix format, each of the plurality of sections comprising at least one of grating unit which comprises one of the plurality of first sub grating units, one of the plurality of second sub grating units, and one of the plurality of third sub grating units, wherein the first sub grating unit, the second sub grating unit, and the third sub grating unit are arranged next to each other in a same grating unit.

32. The directional backlight unit of claim 31, wherein the plurality of first sub grating units are arranged to have heights of lands of the plurality of first sub grating units increase in the first propagation direction.

33. The directional backlight unit of claim 31, wherein the plurality of first sub grating units are arranged to have width of lands of the plurality of first sub grating units increase in the first propagation direction.

34. The directional backlight unit of claim 31, wherein refractive indexes of the plurality of first sub grating units vary in the first propagation direction so that light output efficiency values of the plurality of first sub grating units increase in the first propagation direction.

* * * * *